US 7,839,430 B2

(12) United States Patent
Hentschke

(10) Patent No.: US 7,839,430 B2
(45) Date of Patent: Nov. 23, 2010

(54) AUTOSTEREOSCOPIC REPRODUCTION SYSTEM FOR 3-D DISPLAYS

(76) Inventor: Siegbert Hentschke, Wilhelmshoeher Allee 71, D-34121 Kassel (DE)

( * ) Notice: Subject to any disclaimer, the term of this patent is extended or adjusted under 35 U.S.C. 154(b) by 1434 days.

(21) Appl. No.: 10/549,072

(22) PCT Filed: Mar. 12, 2004

(86) PCT No.: PCT/DE2004/000500

§ 371 (c)(1),
(2), (4) Date: Sep. 12, 2005

(87) PCT Pub. No.: WO2004/081863

PCT Pub. Date: Sep. 23, 2004

(65) Prior Publication Data

US 2006/0170764 A1    Aug. 3, 2006

(30) Foreign Application Priority Data

Mar. 12, 2003   (DE) ............................... 103 11 389
Jul. 27, 2003   (DE) ............................... 103 34 803

(51) Int. Cl.
*H04N 7/18* (2006.01)
(52) U.S. Cl. .......................................... 348/59; 348/51
(58) Field of Classification Search .................. 604/348, 604/358, 380, 385, 19, 385.28, 385.19; 348/42–60
See application file for complete search history.

(56) References Cited

U.S. PATENT DOCUMENTS 6,302,541 B1   10/2001   Grossmann 6,307,585 B1*  10/2001   Hentschke ........................ 348/51
6,791,570 B1*   9/2004   Schwerdtner et al. ....... 345/613
2002/0011969 A1  1/2002   Lipton et al.

FOREIGN PATENT DOCUMENTS

DE    41 14 023    11/1992
DE   198 22 342    12/1999

(Continued)

OTHER PUBLICATIONS

Markus Andiel, Siegbert Hentschke et al: "Stereoscopic Displays & Applications; Eye-Tracking for Autostereoscopic Displays Using WebCams", SPIE: Stereoscopic Displays and Applications XIII, vol. 4660, Jan. 21-23, 2002 (in Eng.).
Cess Van Berkel: "Image Preparation FOR3D-LCD", Philips Research Laboratories, UK, SPIE vol. 3639, 1999, pp. 84-91 (in Eng.).
Cees Van Berkel et al: "Characterisation and Optimisation of . . . " SPIE vol. 3012, Feb. 11, 1997 (in Eng.).

(Continued)

*Primary Examiner*—Andy S Rao
(74) *Attorney, Agent, or Firm*—Michael J. Striker

(57) ABSTRACT

What is described is a position-adaptive autostereoscopic 3-D reproduction system for generating 3-D images or scenes, having a flat image screen (1) with colour subpixels (R, G, B) lying side by side, a raster screen (2), a coding unit (6, 9) and a processor unit (3) for generating perspective images. According to the invention, the coding unit (6, 9) is controllable and the raster screen (2) is dimensioned and arranged such that first and second mutually interlaced subpixel strips appear on the image screen (1) and from these, first and second image strips are generated, which appear to the two eyes of an observer to be disjoint for a defined viewing region in front of the image screen (1), whereby a constant sequence of colours of the subpixels is maintained in the first (second) subpixel strips.

31 Claims, 10 Drawing Sheets

FOREIGN PATENT DOCUMENTS

| | | |
|---|---|---|
| DE | 198 27 590 | 12/1999 |
| DE | 198 31 713 | 1/2000 |
| EP | 0 836 332 | 4/1998 |
| EP | 1 143 747 | 10/2001 |
| WO | 99/05559 | 2/1999 |

OTHER PUBLICATIONS

Boerner, R: "Autostereoskopische Rueckprojektions-Und . . . " Fernseh- Und Kino-Technik 48, Jahrgang, No. 11, 1994.

* cited by examiner

AUTOSTEREOSCOPIC REPRODUCTION SYSTEM FOR 3-D DISPLAYS

CROSS-REFERENCE TO RELATED APPLICATION

The invention described and claimed hereinbelow is also described in German Patent Applications DE 10311389.4 filed on Mar. 12, 2003 and DE 10334803.4 filed on Jul. 27, 2008. This German Patent Applications, whose subject matter is incorporated here by reference, provide the basis for a claim of priority of invention under 35 U.S.C. 119(a)-(d).

BACKGROUND OF THE DRAWINGS

The present invention relates to an autostereoscopic reproduction system.

Compared with 2-dimensional, conventional representations, a 3-dimensional representation comes closer to natural visual perception. The degree of naturalness can be further enhanced by an autostereoscopic, position-adaptive representation. For this purpose, various autostereoscopic imaging methods have been developed which use either barrier masks, lenticular raster masks or prismatic raster masks for optical separation of right and left imaging directions for which different subpixel adaptations are required. Creating these representations required for 3-D animations, interactive games and vector-format films in real time on PCs has so far not been satisfactorily achievable, although stereoscopic films and projection techniques have been in use for years. These use, for instance, polarised light (horizontal/vertical or circular) in order to separate the left and right images. The technical advance of LCD technology made it possible to control the opacity of crystals electronically. This made possible the development of shutter technology whereby the right and left lens of a pair of spectacles alternately become opaque synchronously at half the image frequency and synchronously therewith, the right and left images appear sequentially on the image screen. This method is also used by autostereoscopic shutter monitors.

For several years, autostereoscopic reproduction systems with TFT displays have also been in use, which produce right and left images on an image screen horizontally multiplexed and create spatially separated projection directions by means of raster screens (DE-A-41 14 023, U.S. Pat. No. 6,307,585, DE-A-198 27 590, DE 198 22 342 and van Berkel in "Image for 3D-LCD, Philips Research Laboratories, UK, SPIE vol. 3639, 1999, pp. 84-91). Reproduction systems of this type can also be designed position-adaptive using head-trackers (U.S. Pat. No. 6,307,585 and Andiel, Hentschke et al. in "Eye-tracking for autostereoscopic displays using web cams", SPIE vol. 4660, 2002, pp. 200-206).

In a known reproduction system of the aforementioned type (PAM, EP 0 836 332 A2), the individual image pixels of an image screen formed from three subpixels R, G and B are controlled by means of a coding unit line by line with right and left image strip signals such that in every line alternately right and left subpixel strips are formed, which serve to create image strips assigned to left and right, known in the following as horizontal "multiplexing" or "interlacing" of the left and right images. Furthermore, a raster screen in the form of a prismatic or lenticular raster screen is positioned in front of the image screen such that it brings together the right and left image strips for a defined viewing region in front of the image screen comprising, respectively, a right and a left viewing direction into the right and left images required for 3-D images. For reliable separation of the right and left images, those subpixels are set-dark which fall within empty regions or overlap regions, whereby empty regions contain subpixels not visible from both viewing directions and overlap regions contain subpixels visible from both viewing directions simultaneously. Furthermore, control of the subpixels visible only from the right viewing direction or only from the left viewing direction is performed such that each right or left subpixel strip has exactly three different-coloured subpixels side by side.

In this method of control, the sequence of the individual subpixels in the horizontal—or line—direction depends above all on the respective observer position that is notified to the coding unit, for instance, by means of an autostereoscopic position detector such as a head tracker or eye tracker. It could therefore occur that the sequence of subpixels in a selected subpixel strip is, for instance, RGB and in a subpixel strip lying adjacent to the left or right of it is, for instance, GBR or BRG. From this arises the as yet unsolved problem that colour faults may be thereby caused that at the borders of two subpixel strips, the same colours appear, for instance, if a subpixel strip BRG follows a subpixel strip RGB.

SUMMARY OF THE INVENTION

Following from this, the invention is based on the technical problem of improving the 3-D reproduction system of the aforementioned type such that colour faults of the type mentioned are avoided. Nevertheless, the reproduction system should be able to be operated in real time and with a resolution which at least approaches photographic quality.

The invention has the advantage that it enables reliable separation of right and left images even if the spatially multiplexed subpixel representation is made adaptive with the aid of position detectors. The raster screens used to separate the right and left images may be simple lenticular or barrier raster screens that are mounted at a small distance in front of the image screen concerned. The loss of resolution brought about in the horizontal direction by the spatial separation may be largely recovered by means of a special recoding device.

BRIEF DESCRIPTION OF THE DRAWINGS

The invention will now be described in greater detail, based on examples with the aid of the drawings, in which.

DESCRIPTION OF THE PREFERRED EMBODIMENTS

Figure 1:
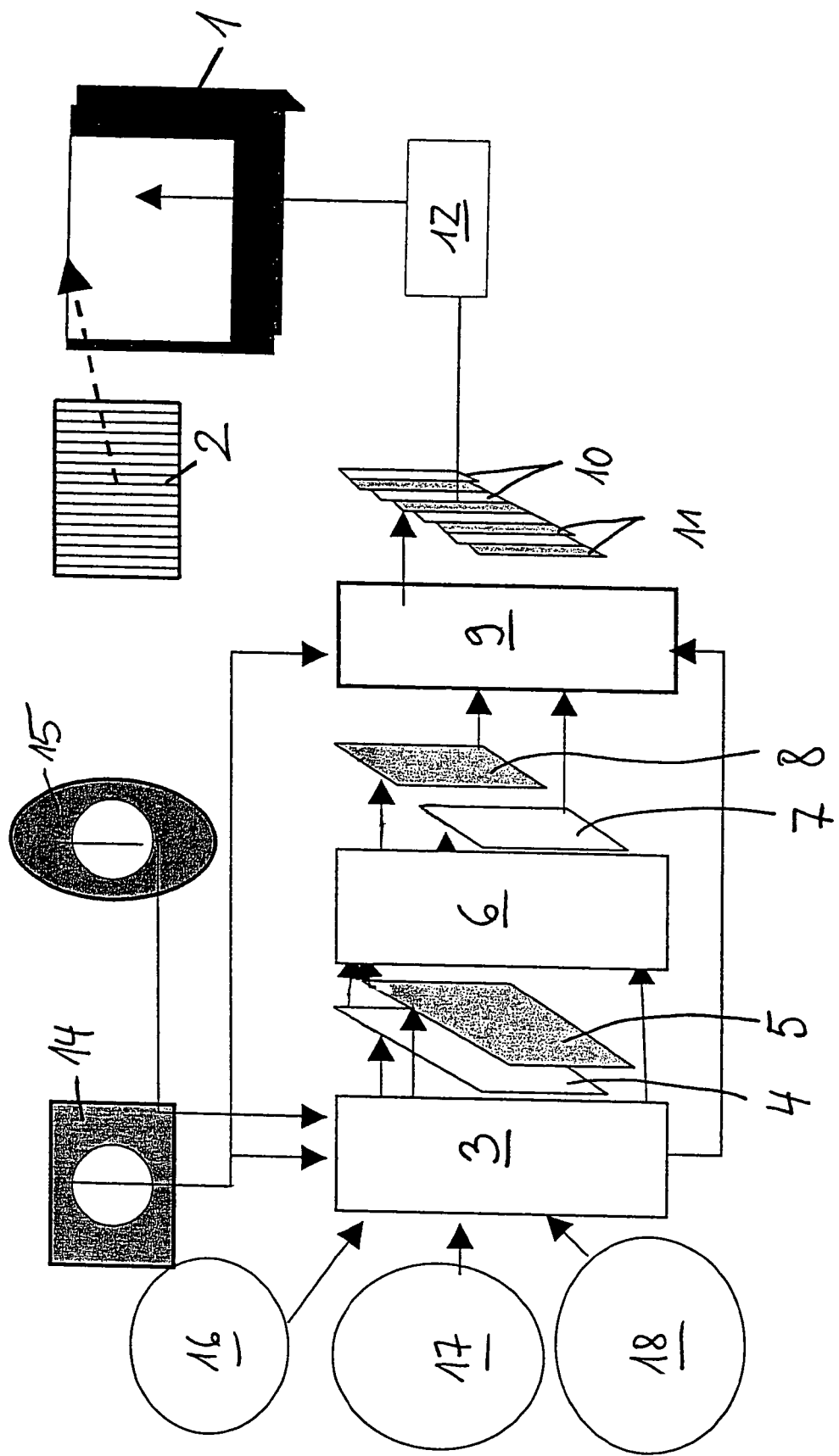
FIG. 1 shows a schematic representation of a 3-D reproduction system according to the invention.
Figure 2:
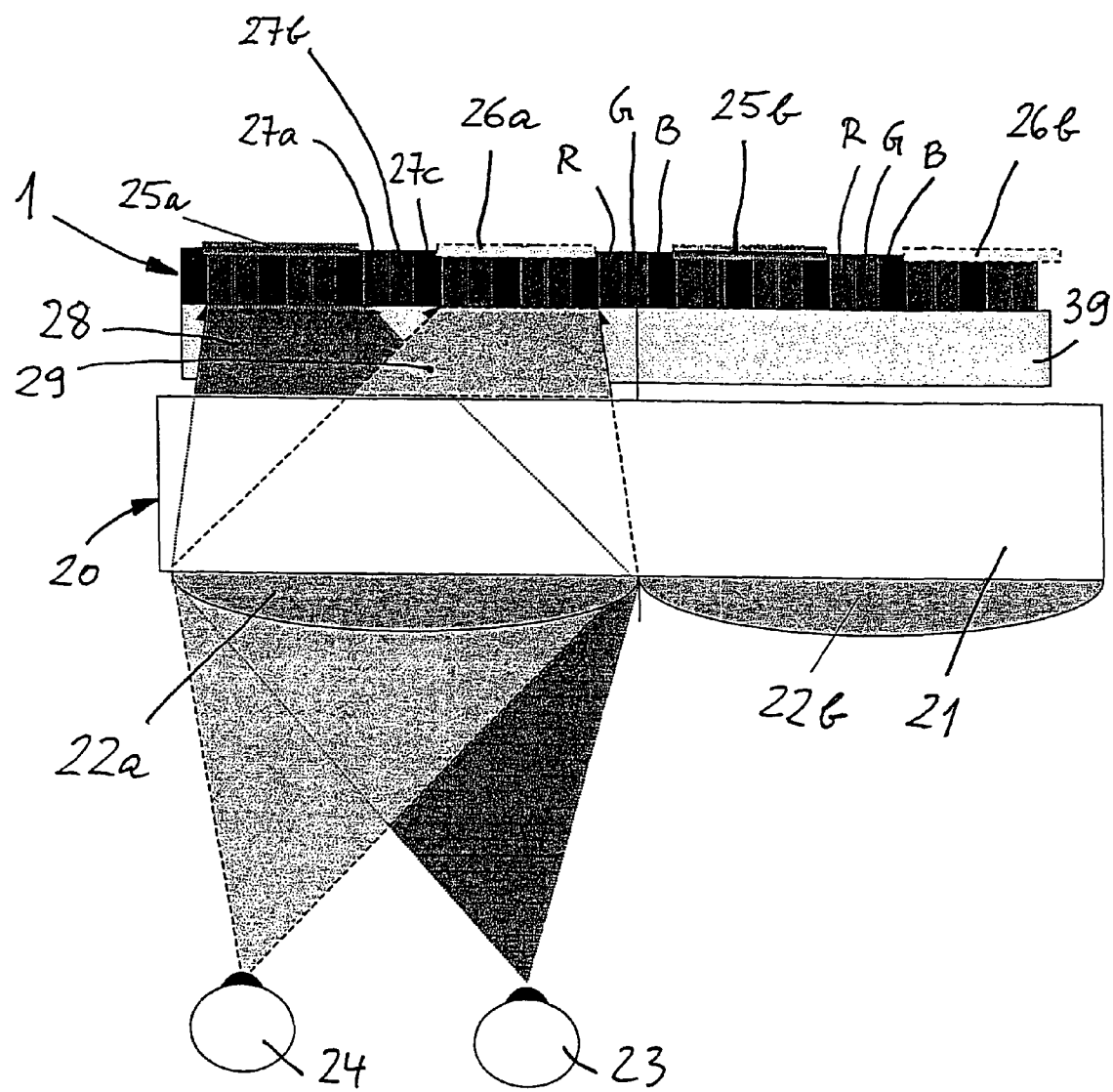
FIGS. 2 and 3 show different representations of optical ray paths for the right and left eye on use of a lenticular raster screen provided with relatively broad cylindrical lenses, for a portion of a horizontal subpixel line of an image screen of the reproduction system of FIG. 1.

FIGS. 1 and 2 show in schematic form a reproduction system according to the invention for 3-D representations which may contain images or scenes. The reproduction system comprises, in particular, a flat image screen 1 (TFT or plasma screen) in front of which is arranged a raster screen 2, designed here as a lenticular raster screen. According to FIG. 2, the image screen 1 comprises a plurality of adjacently positioned, for instance, respectively 1024 to 1920 image pixels each composed of three coloured subpixels in the colours red (=R), green (=G) and blue (=B) lying side by side in a plurality of, for instance 768 to 1200 (horizontal) lines. Within each image pixel, the sequence of subpixels is always the same, e.g. RGB.

A processor unit 3 serves to generate 3-D representations, said processor unit including, for instance, a graphics card provided with a store to which the electrical signals of images, scenes or similar are fed in real time from a camera or similar. Alternatively, these signals may also come from a mass storage device and be continuously updated. The images may also be stored on the card in another form, for instance, in point form.

Right and left image signals are generated by the processor unit 3 in the original size and in pixel form for right and left images 4 and 5 schematically indicated in FIG. 1 by rectangles and respectively stored, for instance, in right and left stores. These image signals are then fed to a block 6 and each compressed, relative to the image screen width, for instance, to a third of their original width and, in particular, in the same proportion as later they are expanded again by the raster screen 2. By this means, image signals for narrow right and left images 7 and 8, indicated by further rectangles, are obtained. Furthermore, the image signals are subjected in block 6 to further treatment explained below and denoted for short here as HR filtering.

The signals of the compressed images 7 and 8 are fed to a further block 9 where they are split into signals for right and left image strips 10 and 11. Calculation of the image strip signals is preferably undertaken adaptively, i.e. dependent upon the position of an observer in front of the image screen, for which purpose, in particular, the respective start position of the image strips 10 and 11 on the image screen following each movement have to be determined anew and precisely. The image strip signals are also interlaced or multiplexed in the block 9 such that the associated image strips 10, 11 alternate as per FIG. 1 in the line direction, whilst in the column direction (vertically), they are, for instance, continuous. The signals representing the right and left image strips 10, 11 are finally fed via a typical interface 12 to the monitor or similar provided with the image screen 1.

In order that calculation of the image strip signals may be made adaptively, for instance, an eye tracker 14 is assigned to the observer, its signals being fed to the processor unit 3 and the device containing the blocks 6 and 9, denoted overall below as the coding unit. Furthermore, the reproduction system of FIG. 1 may be provided in the usual manner with a 3-D mouse 15, an input control system 16, a 3-D library 17 and possibly an adjusting device 18 for person-specific adjustments.

FIG. 2 shows schematically in the uppermost portion, some subpixels of the flat image screen 1 of FIG. 1 identified with the reference symbols R (=red), G (=green) and B (=blue), whereby respectively three such subpixels R, G, B and from left to right in each image pixel always have the same sequence, e.g. RGB-RGB, etc. FIG. 2 also shows that arranged in front of the subpixels representing the image screen 1 is a lenticular raster screen 20 shown in cross-section which has a glass pane 21 and a plurality of adjacent vertically extending cylindrical lenses (e.g. a few hundred) which, for instance, are mounted on the broad side of the glass pane 21 facing towards the observer, of which however only two cylindrical lenses 22a and 22b are shown in FIG. 2. Finally, FIG. 2 shows schematically the optical ray path, starting from a right and a left eye 23, 24 of an observer.

According to the invention, the lenticular raster screen 20 is dimensioned and arranged such that at least the right and left image strips generated in a selected region of the image screen 1 by the subpixels R, G and B appear to the observer to be overlap-free and disjoint and the sequence of colours on the transition from a right (left) subpixel strip to the respective previous or subsequent right. (left) subpixel strip is always continued consistently. This is apparent, for instance, from FIG. 2. Here right and left subpixel strips 25a, 25b and 26a, 26b are alternately formed, each comprising six subpixels R, G and B, whereby the right subpixel strip 25a starts at the left with a green subpixel and ends on the right with a red subpixel, whilst the next right subpixel strip 25b also begins on the left with a green subpixel and ends on the right with a red subpixel, such that—seen over the two pixel strips—the colour sequence G, B, R is always maintained from left to right continuously. Accordingly, for the left subpixel strips 26a, 26b, the colour sequence GBR, GBR is also produced throughout, seen from left to right.

When the number of adjacent subpixels in both the right and the left subpixel strips 25, 26 in FIG. 2 corresponds to a whole-number multiple of the colour number or a whole-number multiple of a pixel width and the pixel strips 25, 26 adjoin each other without intermediate spaces, then the right (left) subpixel strips 25, 26 are automatically separated from each other such that the intermediate spaces or visual jumps between one lateral end (e.g. 26c in FIG. 2) of a right (left) subpixel strip and a facing lateral end (e.g. 26d) in FIG. 2 of a right (left) subpixel strip leading and/or following in the line direction exactly corresponds to a whole number multiple of an image pixel (or of the existing number of pixel colours). It might, however, be regarded as disadvantageous herein that the right and left subpixel strips each border each other directly, which on imprecise positioning of the raster screen 20 and on slight movements of the observer could lead to image faults. It is therefore proposed in a further development of the invention to provide further subpixels R, G and B between the subpixel strips 25, 26. This is made clear in FIG. 2 in that between the subpixel strips 25a and 26a or 26a and 25b or 25b and 26b, three further subpixels 27a, 27b or 27c are arranged in each case. These further subpixels 27 serve, on the one hand, to improve the spatial separation of the subpixel strips 25, 26 while, on the other hand, permitting limited head movements by the observer, as described in greater detail below, but without causing image faults. The latter applies in particular if the number of further subpixels 27 corresponds, according to the invention, to a whole number multiple of the pixel width or of the available pixel colours (here three). In this event, it is also unimportant how many subpixels are present per subpixel strip 25, 26. If each subpixel strip 25, 26 were to contain, for instance, seven subpixels R, G and B side by side, then, for instance, the strip 25a would have from left to right the colour sequence GBRGBRG and the subpixel strip 25b would therefore have the colour sequence BRG-BRGB in unbroken continuation.

FIG. 2 also shows that the coding unit 6, 9 is controllable and the raster screen 20 dimensioned and arranged such that at least those left and right image strips, e.g. 28 and 29, which are generated in a selected region of the image screen 1 (e.g. in its left half) are seen overlap-free by the observer. It is clear that in FIG. 2 the right image strips 28 are generated by the right subpixel strips 25 and the left image strips 29 are generated by the left subpixel strips 26, and all the right or left image strips 28 and 29, of which only two are shown in FIG. 2, are brought together by the raster screen 20 to a right and left image for the right and left eye 23, 24, permitting spatial perception, whereby by means of the raster screen 20, stretching of the images corresponding to the prior compression in the block 6 (FIG. 1) takes place.

Figure 3:
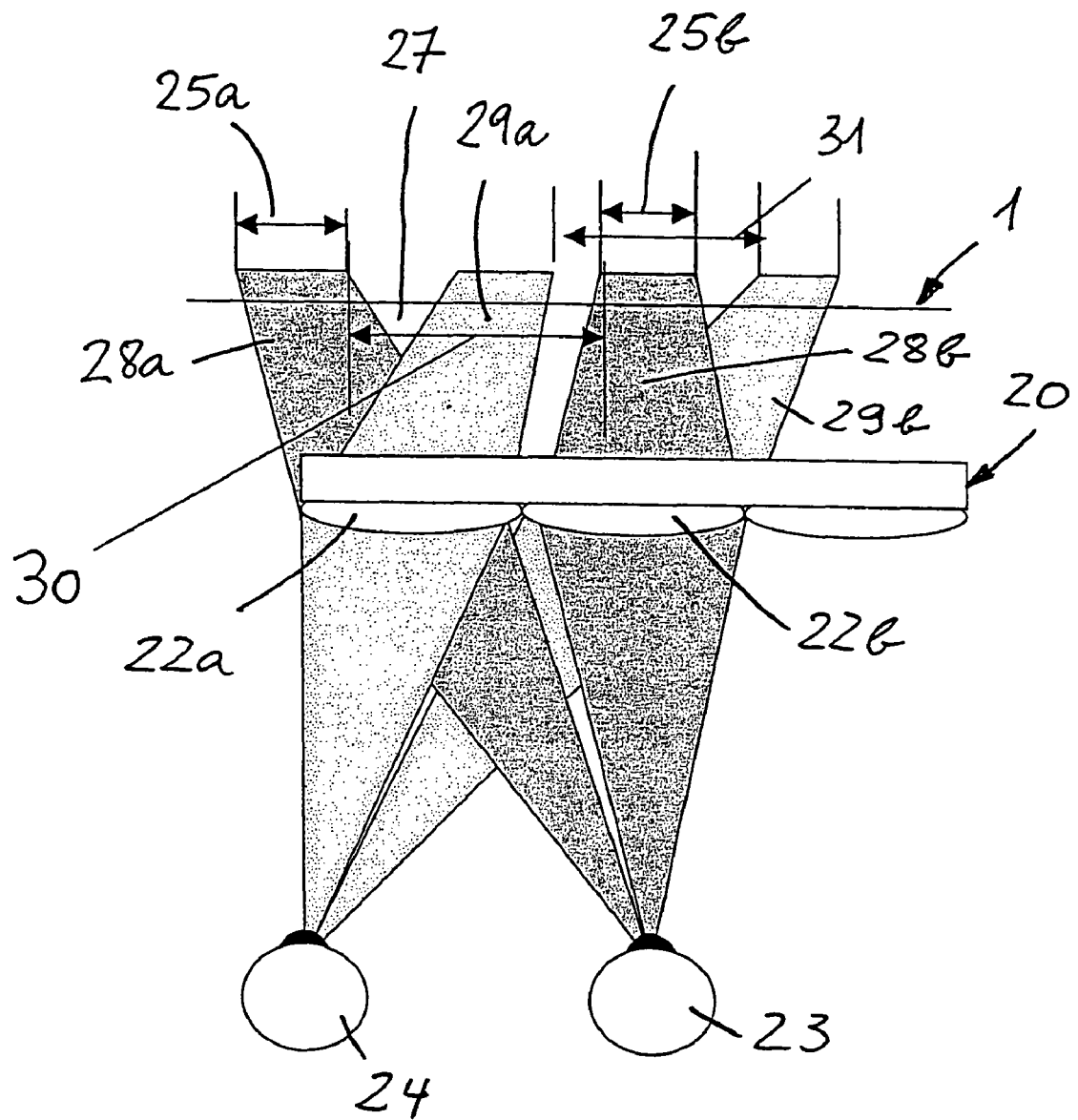

FIG. 3 shows a simplified representation substantially corresponding to that in FIG. 2 except for the missing subpixels, although with two right image strips 28a, 28b and two left image strips 29a and 29b generated by the subpixel strips, which are merged together by the lenticular raster screen 20 to right and left images. From FIG. 3, above all, the above described separations between the ends of the right and left image strips 28a, 28b and 29a, 29b facing towards each other are clearly recognisable as visual jumps 30, 31, each having the width of a whole number multiple of one pixel width (here=3 subpixel widths).

Figure 4:
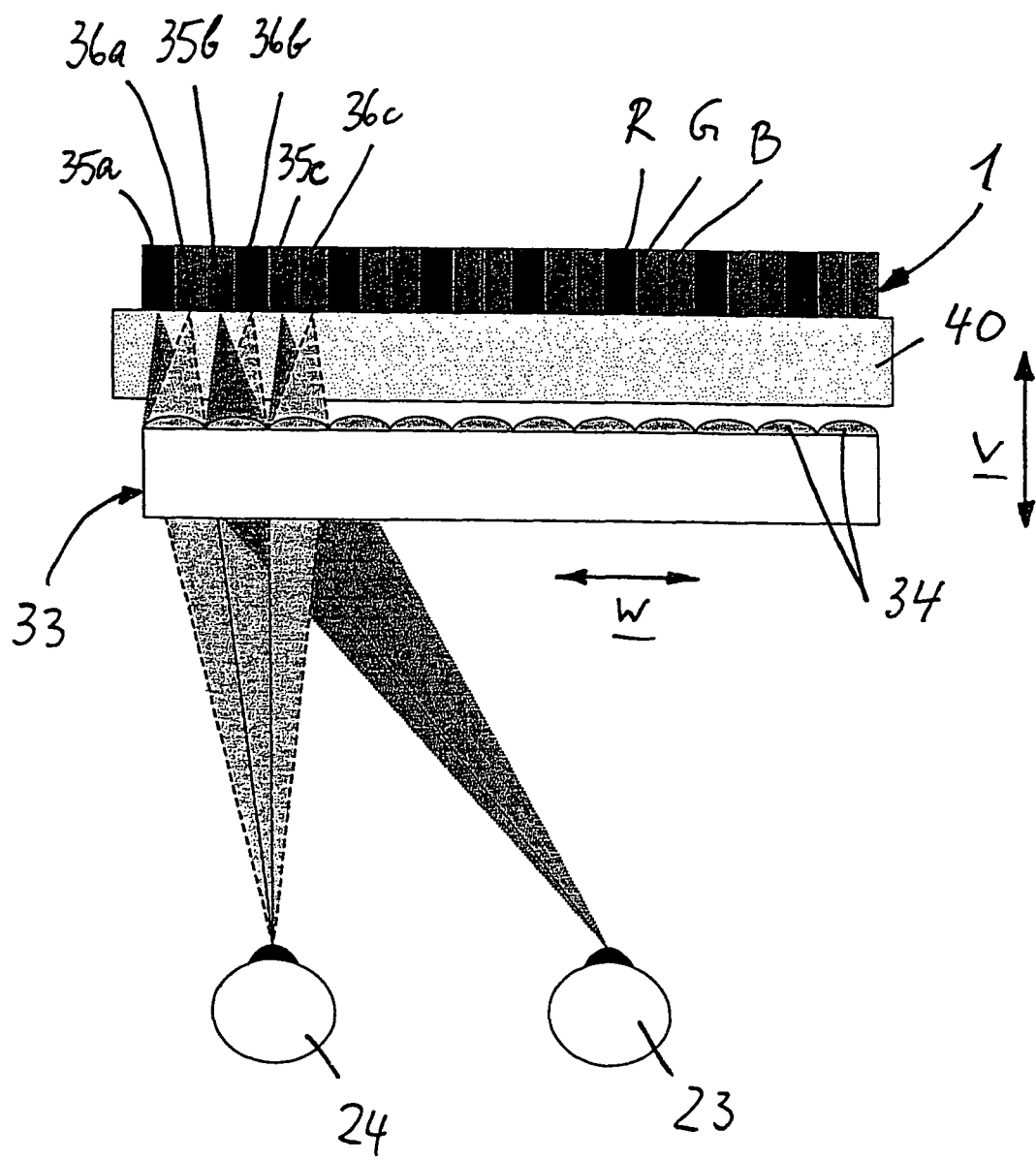
FIG. 4 shows a representation according to FIG. 2 on use of a lentictlar raster screen with relatively narrow cylindrical lenses.

The embodiment according to FIG. 4 differs from that of FIGS. 2 and 3 in that a lenticular raster screen 33 which here is provided on the side facing towards the image screen with cylindrical lenses 34, has a lens width or a pitch separation which substantially corresponds to the width of two subpixels R, G or B. In this embodiment, the coding unit 6, 9 is again controlled in such a manner, and the raster screen 33 dimensioned and arranged in such a manner, that at least the right and left image strips generated in a selected region of the image screen appear overlap-free to an observer and a constant sequence of colours of the subpixels in right (left) subpixel strips 35a, b, c or 36a, b, c is obtained. As distinct from FIGS. 2 and 3, each subpixel strip 35, 36 has the width of one subpixel, and the interlacing is such that the right pixel strip 35 is separated and spaced from a left subpixel strip 36. Therefore associated image strips 37 and 38 which are grouped together by the lenticular raster screen 33, respectively to a right image and a left image, appear to be correspondingly interlaced and multiplexed.

A protective foil 39 (FIG. 2) or 40 (FIG. 4) may be arranged between the raster screens 20 and 33 and the image screen 1.

In contrast to FIGS. 2 and 3, observation of the spatial representations on use of the raster screen 33 is only fault-free when the observer assumes a substantially rigid position relative to the image screen 1, predetermined by the position and form of the raster screen 33.

In order to avoid this fixed arrangement, which is not always desirable, it would be possible to arrange the raster screen 33 movable relative to the image screen 1 in the direction of arrows v and/or w, in order by this means to be able to follow any head movements by the observer.

Figure 5:
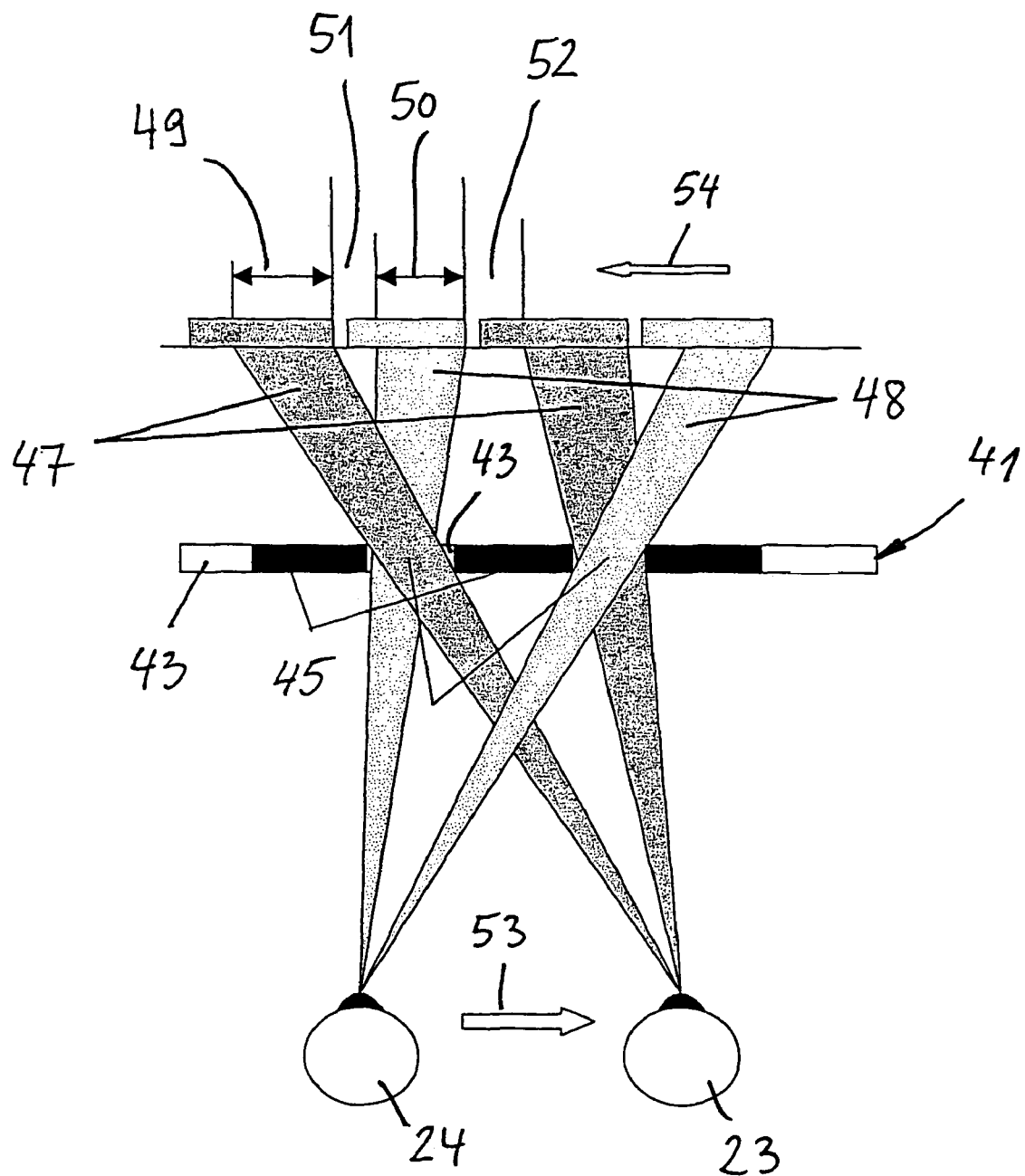
FIGS. 5 and 6 show representations according to FIGS. 2 and 4 on use of a barrier raster screen with larger or smaller raster divisions in the reproduction system of FIG. 1.
Figure 6:
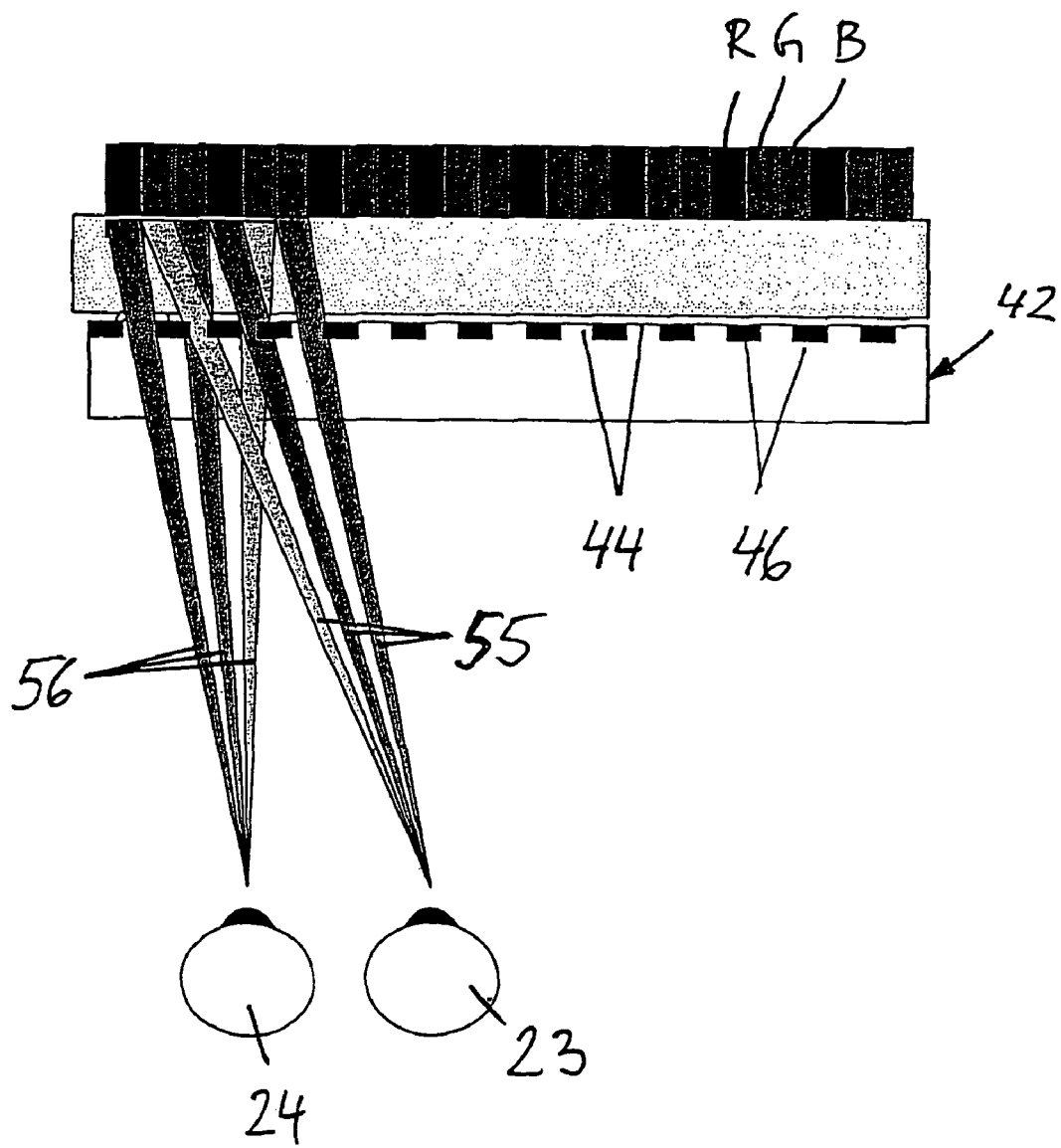

FIGS. 5 and 6 show embodiments according to the invention of a 3-D reproduction system corresponding to FIGS. 2, 3 and 4, on use of a raster screen 41 or 42 in the form of a barrier raster screen which has alternate transparent (vertically arranged) strips or slits 43 (FIG. 5) or 44 (FIG. 6) and arranged between these, opaque barrier strips 45 (FIG. 5) or 46 (FIG. 6), shown black.

With regard to the optical ray path, substantially the same applies for the embodiment according to FIG. 5 as for the ray path according to FIGS. 2 and 3. Each transparent strip 43 has a width here which corresponds to the width of three subpixels. The raster screen 41 is dimensioned and arranged in front of the image screen 1 such that each of the eyes 23, 24 of the observer sees image strips 47, 48, the subpixel strips 49, 50 are generated with a width of three subpixels, and that between these subpixel strips 49, 50, in each case, lie further invisible subpixels 51, 52 which are covered by the barrier strips 45. These further subpixels 51, 52 together have a width corresponding to a whole number multiple of one image pixel such that overall, continuous colour transitions are produced.

The control of the subpixels not shown in FIG. 5 takes place similarly to FIGS. 2 and 3, such that the right and left subpixel strips 49, 50 alternate. Limited lateral movements of the observer in the direction of an arrow 53 result in an opposing displacement of the subpixels visible to the observer in the direction of an arrow 54. The coding unit 6, 9 controlled by the eye tracker 14 or similar is arranged such that it automatically takes account of these changes and, according to the picture, dependent upon the momentary position of the observer, always controls those subpixels that are currently visible through the transparent strips 43.

For the embodiment according to FIG. 6, according to the invention, substantially the same ray path is provided as in the embodiment according to FIG. 4. The raster screen 42 has a pitch substantially corresponding to the width of two subpixels and each transparent slit 44 has approximately the width of a subpixel. Similarly to FIG. 4, the raster screen 42 is therefore dimensioned and arranged such that the subpixels R, G and B alternately generate right and left overlap-free image strips 55, 56 for the right or left eye 23, 34. In contrast to FIG. 5, a fault-free image only results if either the observer assumes a predetermined position in front of the image screen 1 or the raster screen 42 is arranged displaceable, in similar manner to FIG. 4, relative to the image screen.

Figure 7:
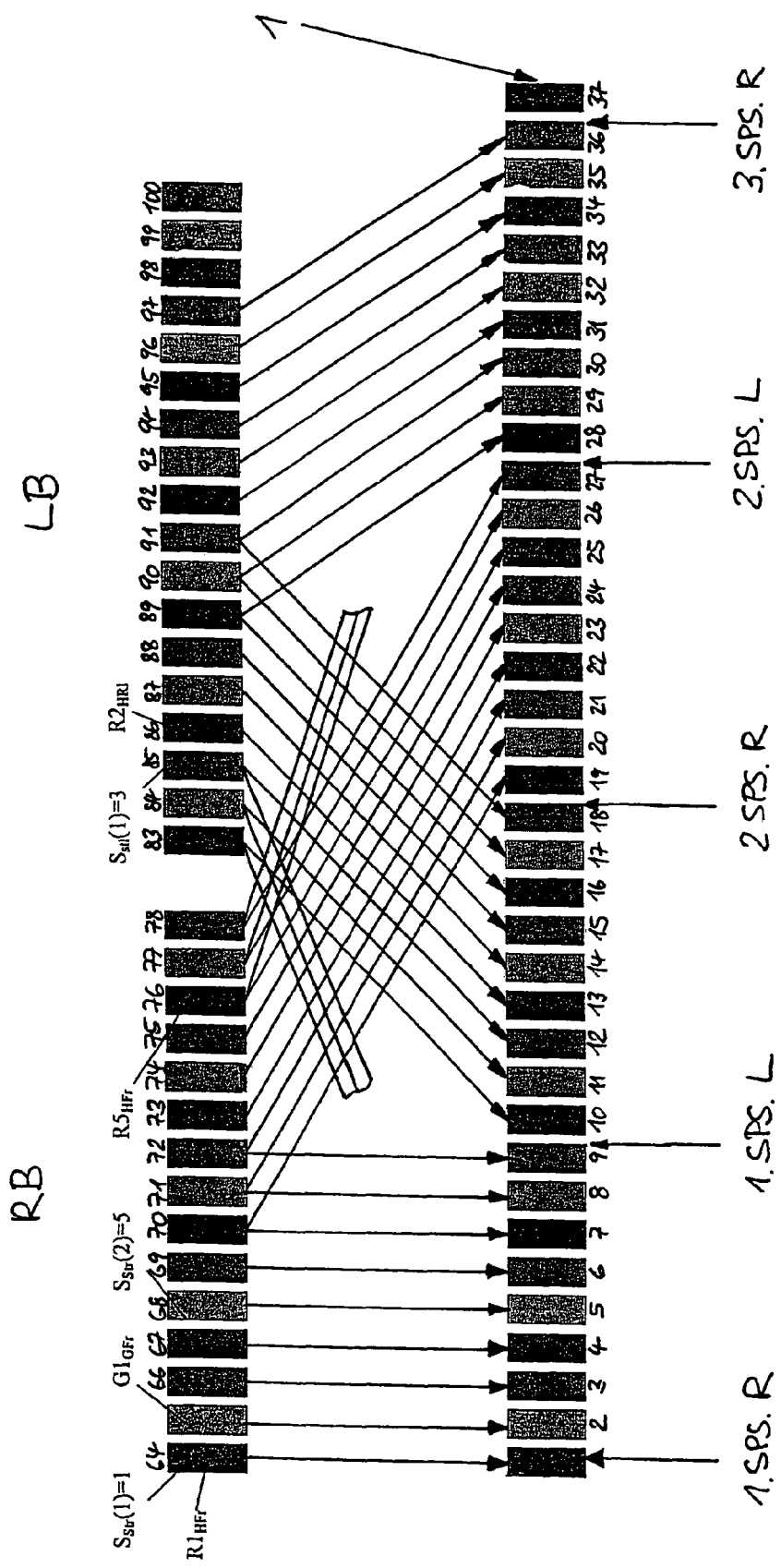
FIG. 7 shows copying procedures of compressed right and left images onto the subpixels of an image screen in interlaced form.
Figure 8:
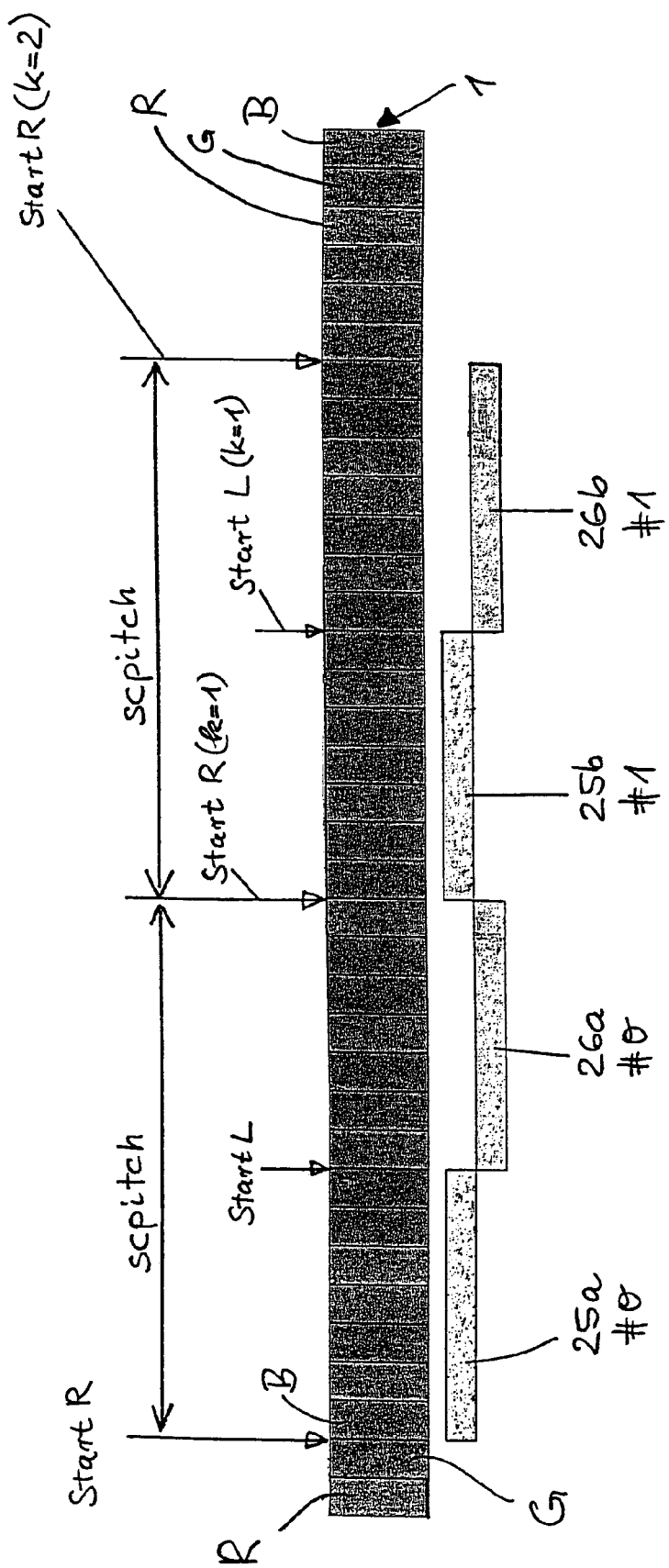
FIG. 8 shows the allocation of subpixel strips dependent upon the position of an observer in front of the image screen.

FIGS. 7 and 8 show in schematic form, the control according to the invention of the subpixels on use of the embodiment according to FIGS. 2 and 3. In order to be able to generate fault-free and largely loss-free right and left images, even given head movements of the observer, the subpixels (in each case, three subpixels R, G and B) lying in the intermediate spaces between adjacent subpixel strips serve as reserves for image information. This should be understood to mean that these subpixels, which are invisible from the assigned viewing angles shown, for instance, in FIG. 2, are controlled using image signals which also correspond to the last subpixels of the previous or subsequent subpixel strip.

In FIG. 7, by way of example, in the upper section, a plurality of image points and in the lower section a plurality of subpixels of the image screen 1 are indicated, whereby the image points are numbered 64 to 78 for a right-hand compressed image and 83 to 100 for a left-hand compressed image. Contrasted with this, the subpixels for an associated line of the image screen 1 are numbered continuously from 1 to 37. According to the above description, each pixel strip contains 6 visible subpixels, followed by three invisible subpixels. This means that in FIG. 7, for instance, at a particular observation angle, the subpixels 1 to 6 and 19 to 24 each comprise a right subpixel strip (=SPS.R in FIG. 7) and the subpixels 7 to 9 and 25 to 27 form invisible reserve subpixel strips adjacent thereto. The subpixels 10 to 15 and 28 to 33 accordingly form a left subpixel strip (SPS.L in FIG. 7) and the remaining subpixels 16 to 18 and 34 to 36 each comprise an invisible reserve subpixel strip. As is indicated schematically by arrows, the visible subpixels 1 to 6 and 19 to 24 are controlled with the information from the image points 64 to 69 or 70 to 75. Simultaneously, the information from the image points 70 to 72 is also copied into the invisible subpixels 7 to 9 and the information from the image points 76 to 78 is also copied into the invisible pixels 25 to 27. Similar copying procedures are carried out for the left-hand images, as FIG. 7 shows clearly.

The described method of additional copying of particular image points into the invisible subpixels 7 to 9 and 25 to 27 has the consequence that in the event that the observer moves his head by exactly one pixel width and therefore now sees, for instance, the subpixels 2 to 7 and 20 to 25, he receives the information from the image points 65 to 70 and 71 to 76. On further displacement by one subpixel, the observer sees, for instance, the subpixels 3 to 8 and 21 to 26 and thereby receives the information of the image points 66 to 71 or 72 to 77. Similarly for the information fed to the left eye and for movements to the left or movements perpendicular to the image screen. What is important in this context is that in the example the observer receives, for instance, the information from the image points 70 to 75, 71 to 76, 72 to 77, etc. continuously and without any colour jump and therefore, in the example, head movements of up to three subpixels to one side or the other can be compensated for without difficulty and without any loss of quality. This also brings both the advantages that errors that can arise due to a raster screen not arranged precisely parallel to the image screen can be corrected, and also that at the end of a subpixel strip, only partially visible subpixels in subsequent or previous subpixel strips are completed to form one whole subpixel. It is thereby achieved that no picture and colour information is lost.

Furthermore, head movements by the observer are suitably constantly notified via the eye tracker 14 or similar to the processor unit 3 and the coding unit 6, 9, in order to carry out new calculations immediately on larger movements, and to recalculate the image signals for the respective observer position, as explained below. By this means, dependent upon the separation of the observer from the image screen 1 and different pitch separations and pitch separations deviating from even numbers, i.e., for instance pitch separations that correspond to a non-integer multiple of a subpixel and then have to be quantised. If, for instance, for some arbitrary observer position, the pitch 9.2 results, then the calculations are initially carried out on the basis of the whole number pitch value 9.0 until the ignored remainder after the decimal point approximates in total to one subpixel. Then calculation continues once with a pitch of 10 subpixels etc., such that on average over the whole screen width, the required pitch of 9.2 always results. By use of fast computers, all these computations including the calculations necessary for the copying procedures can be carried out in real time.

The position-adaptive, high-resolution autostereoscopic reproduction system PARSC of the present invention is a further development of the known position-adaptive autostereoscopic monitors PAM (U.S. Pat. No. 6,307,585). Compared with this system, the present invention improves flexibility, real-time capability and resolution. Flexibility is improved, for instance, thereby that on initialization of the coding unit 6, 9, unique statistical information is transmitted about how the right and left images are generated and interlaced, i.e. how the subpixels should be horizontally multiplexed, as explained below.

On use of the described reproduction system, according to the invention, the following system operation settings may be provided, which may be switched on or off and used individually or in combination:

(S1) Undersampled interlace, (S2) Compression and expansion filtering, (S3) Barrier interlace, (S4) Position adaptation, (S5) Lenticular raster interlace, (S6) High-resolution filtering.

These six basic settings will now be described in greater detail.

(S1): Interlace with undersampling means that, from the right and left images, it is always only those pixels or subpixels that will be picked out strip-by-strip, which are arranged at the positions of the respective subpixels or the respective generated image strips that are being driven on the image screen. These picked-out strips are then represented on the screen spatially multiplexed. This means that the unused strips of both images do not appear and can therefore cause "aliasing" errors, which arise due to information being in the unused strips and therefore becoming lost. When, for instance, a vertical line is situated in such an unused strip of a partial image, it is no longer visible in the reproduced image. Under certain circumstances, however, it could reappear in an adaptive system if the observer moves his head to the side. Such phenomena are also known as Moiré effects. They always arise with undersampling and they are undesirable. An advantage of undersampled interlacing, however, consists therein that it can be carried out particularly simply and rapidly with common graphics cards in that, for instance, a right and a left image store are used and the right and left image strips are realised with simple switches. This means that all the required control operations can be carried out in real time.

(S2): The (S2) version avoids aliasing errors but makes the image less sharp horizontally due to horizontal low-pass filtering. This filtering produces the effect that, for instance, vertical lines only one pixel wide are broadened. This operation may be carried out as low-pass compression filtering such that the images are initially reduced horizontally to the proportion required for the interlacing, for instance one third. The subpixels required for the interlacing may then be taken directly from both compressed images and copied onto the image screen. However, the compressed images may also be expanded to the original breadth by means of a filter and then interlaced in accordance with (S1). An advantage of this is that all the information from the images is used. It is compressed and thus allocated to narrower strips, such that the original image strips may, for instance, appear only half as wide. Therefore, contrasted with the advantage of a continuous image from which no information is lost, is the disadvantage of reduced sharpness.

Suitable coefficients for a low-pass filter are, for instance, as follows:

$$C1_{TP}(I)=(3-|i|)/9 \text{ for } i=-2 \text{ to } +2. \quad (1)$$

Somewhat more favourable is the following cosine filter:

$$C_{TP}2(i)=A\cdot\cos^2(\pi\cdot i/6) \text{ for } i=-2 \text{ to } +2 \text{ and} \quad (2)$$

where $$A^{-1} = \sum_{i=-2}^{+2} \cos^2\left(\frac{\Pi \cdot i}{6}\right)$$

If PO(f,i) are the colour pixels of a line of the right-hand or left-hand original image in the $i^{th}$ column with the individual colour values $R_o(i)=P_o(0,i)$, $G_o(i)=P_o(1,i)$ and $B_o(i)=P_o(2,i)$. The compression filtering can then be carried out pixel-by-pixel as follows:

(3) For i=0 to $N_S/3$ for the column number $N_S$ of the original image:

$$P_S(f, i) = \sum_{\mu=-2}^{+2} C_{TP}(\mu) \cdot P_o(f, 3i - \mu)$$

If the interlace is to be undertaken according to (S1), the low-pass filtration may be carried out without (4) compression is carried out for i=1 to $N_S$:

$$P_F(f, i) = \sum_{\mu=-2}^{+2} C_{TP}(\mu) \cdot P_o(f, i - \mu)$$

From the compressed image, using the filter coefficients $C_F(i) = C_{TP}(i)/A = \cos^2(\pi \cdot i/6)$, the converse expansion filtration may be undertaken, which leads to a low-pass filtered image with the pixels $P_{TP}'(f,i)$. Starting from pixel values set to zero $P_{TP}'(f,i)=0$, the following operation takes place:

$P_{TP}'(f,3i+k) := P_{TP}'(f,3i+k) + C_F(k)P_F(f,i)$, for $k=-2$ to
+2 and $i=1$ to $N_S/3$. (5)

Any required setting to zero or enhancement at the edge region will not be considered in detail here.

(S3): Barrier interlacing has previously been briefly described on the basis of FIGS. 5 and 6.

By means of vertical slits 43, 44 of the barrier raster screen 41, 42, disjoint strips are made visible on the image screen for the right and left eyes 23, 24. Those subpixels which cover the $i^{th}$ visible strip on the image screen are filled with the right or left pixel values of the i-pixel of the right or left compressed image. A slit in the barrier raster screen is approximately as wide as three subpixels R, G, B or similar (FIG. 5) or as one subpixel (FIG. 6).

In order to obtain the subpixel numbers and colours on the image screen which belong to the right or left visible strips, the precise starting positions of these strips are calculated. According to the ray paths in FIGS. 2 and 7 and in accordance with FIG. 8, for instance, the first right-hand strip begins at the position startR and the left-hand strip begins at startL. The $i^{th}$ strip then begins displaced to the right by i·scpitch, that is the $i^{th}$ multiple of the image screen pitch. If $Kr_{SPB}(i)$ and $Kl_{SPB}(i)$ are the subpixel numbers on the image screen, starting at 0, and spsize is the width of one subpixel, then the $i^{th}$ right and left strips begin with the following numbers:

$Kr_{SPB}(i) = \text{int}\{(\text{start}r + i \cdot \text{scpitch})/\text{spsize}\}$ (6)

$Kl_{SPB}(i) = \text{int}\{(\text{start}l + i \cdot \text{scpitch})/\text{spsize}\}$. (7)

Here, int{ } is the integer function which expresses the whole-number portion of the rational number. The $i^{th}$ right-hand strip then comprises $Kl_{SPB}(i) - Kr_{SPB}(i)$ subpixels. The values $R_{Fr}(i)$, $G_{Fr}(i)$, $B_{Fr}(i)$ of the $i^{th}$ pixel of the right-hand compressed image is copied in colour-true manner onto these subpixels. A similar procedure is followed for the left-hand strip.

As a rule, the colours of the subpixels of a pixel have the sequence red R(2), green G(3), blue B(4). From the number of the subpixel on the image screen, its colour is obtained via the module-3 function:

$f_r(i) = \{Kr_{SPB}(i)\} \mod(3) = \{Kr_{SPB}(i)\} - 3 \cdot \text{int}\{Kr_{SPB}(i)/3\}$ (8)

Here, f=0 stands for R, f=1 stands for G and f=2 stands for B. With a fixed interlace according to (S3) of this type, there are as a rule three fixed positions from which the 3-D vision is satisfactory. The interlace operation may, however, be altered so fast that rapid adaptation to changing observer positions is possible. For an adaptive solution of this type, however, the head tracker or eye tracker 14 is needed (FIG. 1).

(S4): Position adaptation serves the aforementioned purpose of always finding on the image screen 1 exactly the correct subpixels belonging to the images, even if the observer makes sudden movements. This position adaptation will now be described, by way of example, based on FIGS. 7 and 8 in which the abbreviations used below are shown, in addition to the reference symbols also used in FIG. 2. The arrow heads point to particular positions on the image screen 1. In the coding unit 6, 9, as the indication "Start" signifies, the precise start positions are calculated, from where assignment to the individual subpixels starts. Depending upon the position of the observer, the arrow head may wander from "Start" to the right or the left. If the arrow jumps from one subpixel to an adjacent subpixel, then as described below (see also FIG. 7), a corresponding altered assignment of the subpixels to the subpixel strips or the image strips produced by them takes place.

The position of the observer is identified with the vector OP (observer position) or with OP(x), OP(y), OP(z). Most TFT image screens start image build-up and storage at the bottom left corner. The origin of the relative coordinate system is therefore placed in the bottom left corner of the image screen. The x-direction is the horizontal direction towards the right, the y-direction is upwards on the image screen and the z-direction is the direction perpendicular to the image screen running forwards. The separation of the observer from the image screen is then identical to OP(z). For the interlacing of is the images, it is sufficient to know the average positions of the eyes and for the ideal separation of the raster mask in front of the image screen, apart from the standard position OP0, the eye separation of the observer is also of interest: EyeD=|Eyer−Eyel|. The standard or starting coordinates of the observer are identified as OP(x0), OP(y0), OP(z0). The most favourable separation of the raster mask from the image screen RSD is found from the raster mask pitch rmpitch:

$RSD = r\text{mpitch} \cdot OP(z0)/(2 \cdot \text{Eye}D)$. (9)

This separation remains constant with continuous position adaptation. From the observer position, the mask pitch increases slightly as far as the image screen and gives the image screen pitch scpitch (screenpitch). The variable image screen pitch is then $sc\text{pitch} = r\text{mpitch} \cdot \{1 + RSD/OP(z)\}$. (10)

The start position of the first visible right-hand strip on the image screen is then also dependent upon the observer position:

$\text{start}r' = K0 \cdot sc\text{pitch} - \{OP(x) + \text{Eye}D/2\} \cdot RSD/OP(z)$, or for the left eye (11)

$\text{start}l' = K0 \cdot sc\text{pitch} - \{OP(x) - \text{Eye}D/2\} \cdot RSD/OP(z)$. (12)

K0 is meant as the smallest whole number for which startr is positive, in order to avoid negative subpixel positions.

In order to ensure sufficient separation between right and left—including in a defined observer position—the invisible strips (e.g. 27 in FIG. 3) are provided between the visible strips (e.g. 25 and 26 in FIG. 2). In these strips 27, the representation remains free. A flexible allocation to right or left is, explained below, dependent upon a movement prediction for the observer. A precondition of this is, initially, a mean distribution of the unusable strips, i.e. the interlacing is oriented towards a mean eye position, whereby the change in the projected separations is not taken into account. From this, the mean start position is found:

$$\text{start} = K0 \cdot \text{scpitch} - OP(x) \cdot RSD/OP(z). \quad (15)$$

For the $i^{th}$ strip, starting at i=0, the following numbers of the strip start subpixels are found:

$$Kr\text{SPStart}(i) = int\{(\text{start} - \text{scpitch}/4 + i \cdot \text{scpitch})\text{spsize}\} \quad (16)$$

$$Kl\text{SPStart}(i) = int\{(\text{start} + \text{scpitch}/4 + i \cdot \text{scpitch})/\text{spsize}\}. \quad (17)$$

For adaptive calculation of the starting subpixel positions of the interlaced strips, for each new frame two variables are needed and these must be updated up to 100 times per second. If a maximum permissible value is set for these two variables, the required accuracy may be adapted dependent upon the subpixel width. It is apparent that quantising of the values from "start" to 8 bit=1 byte and for "scpitch" to 16 bit=2 bytes is sufficient. This implies a minimum update data flow of approximately 300 byte/s.

The position adaptation described may be applied on use both of the lenticular raster screen 21, 33 (FIGS. 2 and 4) as well as the barrier raster screen 41, 42 (FIGS. 5 and 6).

(S5): Interlacing on use of the lenticular raster screens 21 and 33 (FIGS. 2 and 4) is illustrated schematically in FIG. 7. The upper line represents the already compressed right and left images.

The optical ray path on use of a lenticular raster screen is shown in FIGS. 2 to 4. A comparison with the barrier raster screen (FIGS. 5 and 6) shows that similar right and left strips and invisible regions are formed, but continuous right and left images without stripes that are disturbing to the eyes are formed. Nor is brightness absorbed any longer. In order to determine the start positions for the subpixels of the right and left strips on the image screen, the same algorithm may be used according to the formulae (15) and (16). In order to achieve a greater horizontal resolution, the individual subpixels are copied from the compressed images into the strips provided without the sequence of the subpixels within a strip being altered. The colour-true interlaced copying of the compressed images in strip regions makes necessary additional calculation of the assigned starting subpixels in the compressed image to the respective starting subpixels in the right and left strips on the image screen. The lenticular profile of the raster screen is calculated here such that the image continues in the following lens in the subpixel colour with which the first ends. Should a sight change occur, directly between two subpixels, the following lens begins with the follow-on colour, i.e. after R comes G, after G comes B, after B comes R. This allocation is ensured by the following algorithm. The first subpixel that can be used in the compressed right-hand image is the colour subpixel in the first pixel which has the colour of the starting pixel of the first right-hand strip on the image screen:

$$F_{r0} = \{Kr_{SPStart}(0)\} \bmod(3), \text{ with } f=0 \text{ for } R, f=1 \text{ for } G \text{ and } f=2 \text{ for } B. \quad (18)$$

The left-hand first strip begins with the colour $$f_{10} = \{Kl_{SPStart}(0)\} \bmod(3). \quad (19)$$

These colour pixels are therefore taken from the first pixels of the compressed images. The first pixels generally have the number "0". In increasing sequential order, the subpixels are now copied into the strips from the compressed source images until the next strip begins with the subpixel numbers $Kr_{SPStart}(1)$ and $Kl_{SPStart}(1)$. The following numbers give the starting subpixels in the source images:

$$Krq_{SPStart}(I) = int\{(\text{start} - \text{scpitch}/4 + i \cdot \text{scpitch})/\text{spsize} - SPJ\} \text{ and} \quad (20)$$

$$Klq_{SPStart}(i) = int\{(\text{start} + \text{scpitch}/4 + i \cdot \text{scpitch})/\text{spsize} - SPJ\}. \quad (21)$$

SPJ is a system-specific whole number which may be one or multiples of three and ensures that at the transition from one lens to the next, the right colour is selected. For SPJ=0, the counting takes place on the image screen. FIG. 4 shows an example for SPJ=1 and FIG. 2 shows an example for SPJ=9. The HR interlacing is also illustrated in FIG. 7. This drawing shows that on copying of the subpixels into the strips, the starting subpixels in the source image start ever further forward than where they were ended in the previous strip. This ensures the continuity.

This sequence of the copying procedure maintaining the subpixels is preferably designated High Resolution Space Multiplexing.

(S6): A further high-resolution filtration, designated HR filtering or "HR sharp filtering" here, serves to improve resolution. The distribution of brightness and of colour is divided among different pixels and the surroundings.

It is assumed that the original coloured source images from the right and left viewing perspectives are available in the full resolution of the monitor used, e.g. 1600×1200 pixels. The novel property of the filtration described below is that the brightness information in the images is filtered quite differently from the colour information. The possible increase in resolution compared with previous colour image representations is thereby achieved that optimal adaptation to the visual physiological perception properties takes place. The adjoining arrangement of the subpixels on a TFT screen is thereby utilised. The basic idea is to distribute the brightness information over the subpixels and to distribute the colour information over the surroundings. By this means, the resolution for brightness can be tripled in the horizontal direction, whilst more than ⅔ of the information is filtered out of the colour information. The different perception by the human eye of brightness and colour is used by, among other things, PAL coding in that with a relatively small additional channel, a high level of colour quality is achieved in television pictures. In the current autostereoscopic representation of colour images, the horizontal direction of each partial image is magnified approximately three times by the cylindrical lenses. This means that the original information content of the brightness information can be largely retained during compression filtering. Thereby that on stereoscopic representation, a right and a left image exist, in end effect the brightness information content is doubled compared with a conventional two-dimensional representation. By this means, a subjective doubling of the image quality is achieved with the invention described here, and with this 3-D photographic quality, the leap into a three-dimensional perception with a flat screen display is also achieved.

1. Brightness filtering. The original images are designated $P_{or}(f,i,k)$ and $P_{ol}(f,i,k)$. k is the counter for the numbers, i for the columns and f for the colours R, G, B and the brightness Y=(R+G+B)/3. In general, k runs from 0 to 1199, i from 0 to 1599 and f from 0 to 3. The first step is pixel-by-pixel filtering of the brightness values Y to the subpixels in the compressed image $P_{HFr}(f,m,n)$. The filter has the coefficients $H_{YFr}(v,\mu)$. The filter properties will now be described in greater detail using two examples: one which only operates within one line and one which encompasses the upper and lower lines. The first condition placed on the coefficients is that a constant grey value in the original image supplies the same constant grey value in the target image. That means: the total over all the coefficients is one.

$$\sum_{\mu,\nu} H_{XF}(\mu, \nu) = 1 \quad (22)$$

The second condition is that a white pixel in the original image supplies in total a white image again—in the surroundings of the target pixel. This leads to the following three conditions:

$$\sum_{\mu=-3,0,+3} \sum_{\nu=-1}^{+1} H_{YF}(\mu, \nu) = \frac{1}{3}; \quad (23)$$

$$\sum_{\mu=-2,1} \sum_{\nu=-1}^{+1} H_{YF}(\mu, \nu) = \frac{1}{3}; \quad (24)$$

$$\sum_{\mu=1,2} \sum_{\nu=-1}^{+1} H_{YF}(\mu; \nu) = \quad (25)$$

The filtering operation may be described with f(m)=(m) mod(3)=m−3·int{m/3} and i(m)=int{m/3}, and $$P_{HFr}(f(i), i(m), n) = \sum_{\mu,\nu} H_{YF}(\mu, \nu) \cdot P_{or}(3, m - \mu, n - \nu) \quad (26)$$

The following first number example describes a line operator whereby the filter coefficients are zero for v=+1,−1

TABLE 1

Filter coefficients for a HR line filter

| $H_{YF(\mu;\nu)}$ N | M | −3 | −2 | −1 | 0 | 1 | 2 | 3 |
|---|---|---|---|---|---|---|---|---|
| 0 | | −1.5/9 | 1/9 | 2/9 | 6/9 | 2/9 | 1/9 | −1.5/0 |

The next example illustrates a line-crossing filter operation:

TABLE 2

Filter coefficients for a line-crossing HR filter

| $H_{YF(\mu;\nu)}$ N | M | −3 | −2 | −1 | 0 | 1 | 2 | 3 |
|---|---|---|---|---|---|---|---|---|
| −1 | | −0.65/9 | 0.1/9 | 0.4/9 | −0.5/9 | 0.4/9 | 0.1/9 | −0.65/9 |
| 0 | | −1.2/9 | 0.8/9 | 1.2/9 | 9/9 | 1.2/9 | 0.8/9 | −1.2/9 |
| 1 | | −0.65/9 | 0.1/9 | 0.4/9 | −0.5/9 | 0.4/9 | 0.1 | −0.65/9 | filter.

This two-dimensional filter is designed such that the coefficients decrease in reciprocal proportion to the separation from the centre. The design with $H_{YF}(0,0)=1$ is an extreme example, which comes into effect for natural images if the original contrast range was previously reduced in order to be able to increase it again during HR filtering for sharpness elevation. For instance, the value range of the source images (0-255) could be compressed to 40 to 220. That is one method by which the achievable sharpness effect may additionally be weighed against a contrast effect.

This brightness-HR filtering provides a grey image on average. If, however, the permissible range between 0 and 255 is exceeded in the target image, then the range for visualising must be restricted again to the permissible range. In the process, colour effects can arise, which depend upon the image content.

2. Colour filtering: in a second step, the colour information is now added again with a reduced local resolution. For this purpose, the compressed image generated under (S1) in Equation (3) may be utilised again for right and left.

$$P_S(f, i) = \sum_{\mu=-2}^{+2} C_{TP}(\mu) \cdot Po(f, 3i - \mu) \quad (27a)$$

In this image, for right and left, the colour difference values are generated for the brightness value Y=(R+G+B)/3: DR=R−Y; DG=G−Y; DB=B−Y. This operation is set out in Equation (27):

$$P_{Sr}(f + 3, i, k) = P_{Sr}(f, i, k) - \sum_{f=0}^{3} P_{Sr}(f, i, k) \cdot \frac{1}{3} \quad (27)$$

The same operation is undertaken for the left compressed image. The difference values are overlaid again—distributed over the surroundings—on the HR-filtered grey image. This is carried out anew by means of one or two-dimensional low-pass filtering. As the low-pass filter, for instance, that in Equation (2) may be used again. This then results in the following operation, three times for f=0, 1, 2:

$$P_{HRr}(f, m, n) := P_{HRr}(f, m, n) + \sum_{\mu=-2}^{2} C_{TP2}(\mu) \cdot P_{Fr}(f + 3, m - \mu, n) \quad (28)$$

Still more favourable would be a two-dimensional low-pass filter $C_{TP}3(i,k)$, e.g. for i, k from −1 to 1, whereby the sum must again equal 1. The coefficient values could be the following in Table 3:

TABLE 3

Simple 2-dimensional low-pass filter for inserting the colours.

| $C_{TP}(i, k)$ K | I = | −1 | 0 | +2 |
|---|---|---|---|---|
| −1 | | 1/15 | 2/15 | 1/15 |
| 0 | | 2/15 | 3/15 | 2/15 |
| +1 | | 1/15 | 2/15 | 1/15 |

The filtering would then become the following operation, which is naturally somewhat more effort to carry out than a one-dimensional version.

$$P_{HRr}(f, m, n) := P_{HRr}(f, m, n) + \sum_{\mu,\nu=-1}^{+1} C_{TP3}(\mu, \nu) \cdot P_{Sr}(f + 3, m - \mu, n - \nu) \quad (28)$$

The symbol ":=" stands for the programming-related designation for replacement of the same variables on the right side by the result of the left side.

The same operation should naturally be carried out for the left image.

At the end, the range limitation must still be carried out and the floating point numbers must be rounded to whole numbers between 0 and 255. Two steps are available for this. 1. A range that is possibly too large may be compressed; 2. Numbers below 0 and over 255 may be set to 0 or 255.

To conclude the description of HR filtering, an alternative presentation of the colour pixels will now be mentioned, which is known as the h-c-perception model (hue, colour). This model also contains information about the colour saturation. The R, G, B pixel values may be unambiguously converted into h-c values as follows and also back again.

$$h=\sqrt{R^2+G^2+B^2} \tag{29}$$

The minimum white content is determined: w=min{R, G, B}, and from the difference value DR=R−w, DG=G−w, DB=B−w, a colour angle which lies between 0 and 360 degrees is calculated.

Dependent upon which difference vanishes, the following apply:

$$\Theta = \frac{240^i}{\pi} \cdot atn\left(\frac{DG}{DR}\right) \quad DB = 0 \tag{30}$$

$$\Theta = \frac{240^\circ}{\pi} \cdot atn\left(\frac{DR}{DB}\right) + 120^\circ \quad DR = 0$$

$$\Theta = \frac{240^\circ}{\pi} \cdot atn\left(\frac{DR}{DB}\right) + 240^\circ \quad DG = 0$$

On use of the colour model, the intensity value h is HR-filtered as Y previously was, and subsequently the colour is added filtered with a low-pass filter.

On mounting the previously described lenticular raster screen 20 (FIG. 2), it may arise that the separation of the raster screen 20 from the surface of the image screen 1 is not precisely maintained. Such slight separation deviations lead to slight colour Moiré faults in the images. If the separation is not precisely maintained, the visible subpixel strips become somewhat smaller or larger, such that particular colours are frequently repeated within an image strip. According to the invention, therefore, the cylindrical lenses 22a, 22b (see also FIG. 2) are, for instance, arranged angled to the vertical, such that they distribute the colours evenly over the existing subpixels R, G and B and the colour Moiré faults disappear.

Figure 9:
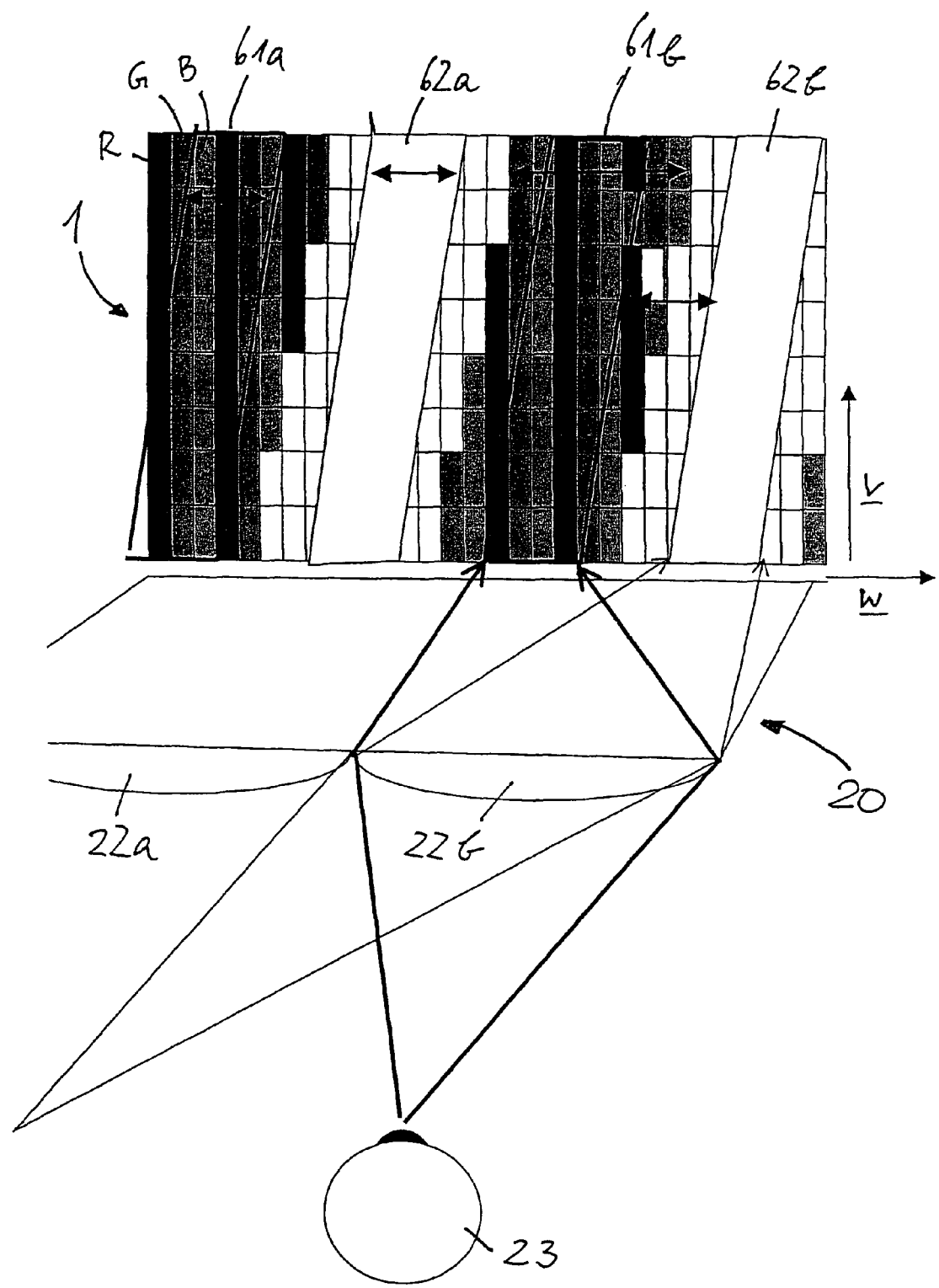
FIG. 9 shows a representation of an optical ray path corresponding to FIG. 2, but in conjunction with a plurality of subpixel lines of an image screen of a reproduction system of FIG. 1 arranged vertically above one another.

In order to avoid colour faults, the cylindrical lenses 22a, 22b of the raster screen 20 according to FIG. 9 are arranged not vertically, but slightly inclined to the right or the left, whereby the inclination is at an angle of between 0° and 45° (−45°) to the vertical direction (arrow v in FIG. 9). Naturally, the subpixel strips assigned to right and left must then have the same inclination. In FIG. 9, for the sake of clarity, only two right visible subpixels 61a, 61b and two left visible subpixel strips 62a, 62b are shown on the image screen 1. According to the invention, the inclination of these subpixel strips 61, 62 is thereby achieved that of the subpixels which physically are still vertically arranged, by means of software, those subpixels are switched that lie on the subpixel strip lying inclined in FIG. 9. Under minute observation, the subpixel strips 61, 62 lying inclined are therefore bordered on both sides by stepwise structured flanks of the individual subpixels R, G and B. The invisible reserve subpixel strips lying between these are similarly inclined.

The inclination of the cylindrical lenses 22a, 22b and of the subpixel strips 61 and 62, expressed as the ratio of the vertical to the horizontal image screen sections is, according to the invention, preferably in the range 6:1 to 3:1. FIG. 9 shows an example with an inclination/slope of 6:1. The right and left subpixel strips 61, 62, which are controlled in inclined manner, are each formed on average of eight controlled subpixels, of which approximately four are visible behind the lenses.

With an inclined arrangement both of the cylindrical lenses 22 and a correspondingly inclined control of the subpixels R, G, B which are fundamentally arranged vertically on the TFT image screen 1, in order to form inclined subpixel strips 61, 62, fine adjustment of the lenticular raster screen 20 to the TFT image screen 1 using test images that can be defined in advance, is possible in software by correcting the subpixel control. By this means, displacement of the controlled subpixel strip 61, 62 in the horizontal and/or vertical direction is possible with the accuracy of one subpixel R, G, B. The inclined position described, both of the cylindrical lenses 22 and of the visible subpixel strips 61, 62 leads, for the human eye, to a seemingly averaged-out colour fault in the vertical direction. Since, however, due to the inclined arrangement, the colour Moiré faults are largely suppressed, a fine adjustment of this type, accurate to one subpixel, is tolerable with regard to any colour faults. Therefore, the fine adjustment described is also more advantageous than inclination of the subpixel strips alone, which is also possible, i.e. using vertically arranged lenses, since colour Moiré faults can be further increased by this.

Figure 10:
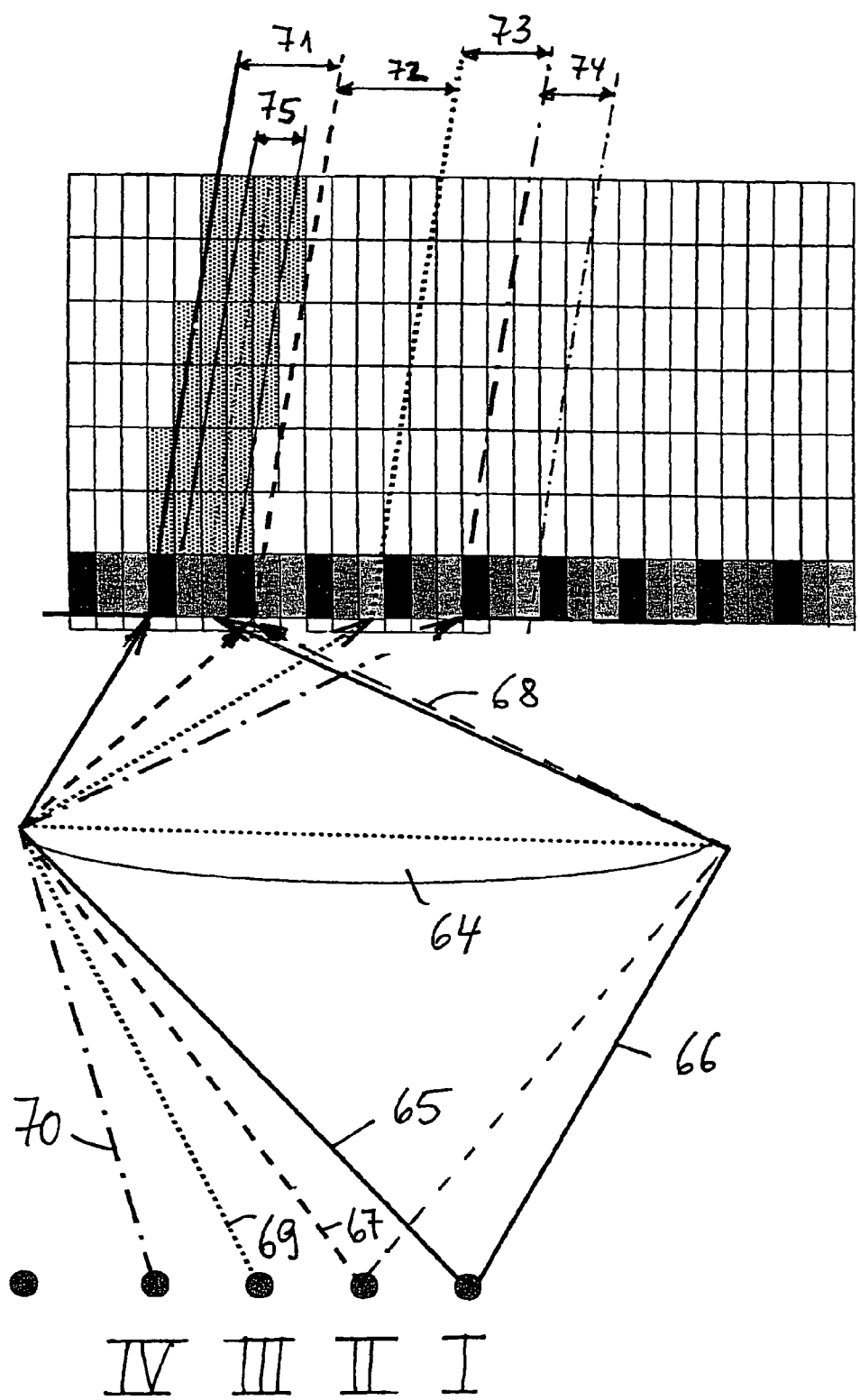
FIG. 10 shows in a representation corresponding to FIG. 9, a further embodiment of the invention.

In the above embodiments, it has been taken as a precondition that the subpixels are each controlled on the image screen 1 such that without use of an eye tracker or similar, a 3-D representation is obtained substantially only for one particular viewing direction. On the other hand, FIG. 10 shows that the device according to the invention, with corresponding use of the above method features and device features is also simultaneously suitable for viewing a 3-D image from a plurality of viewing directions, such that the same image may be seen by a plurality of observers simultaneously and with the perspectives appropriate to the respective viewing direction. For this purpose, preferably large-scale image screens with, for instance, 12,000 or more pixels per line and, for instance, 2,400 lines are used in order that a sufficient number of subpixels is available for each perspective.

FIG. 10 shows, in exemplary manner, the ray path for a reproduction system of this type. As shown, for instance, in FIG. 4, a lenticular raster screen 64, of which only one cylindrical lens is shown, is designed and arranged in front of the image screen 1 such that from a position I in front of the image screen 1, for instance, 3 subpixels R, G and B are seen with one eye, which form a subpixel strip or image strip delineated by the edge rays 65 and 66 drawn with solid lines. The next ca. 5 subpixels to the right in FIG. 10, however, are seen from a position II, and the subpixel strips or image strips seen from there are delineated by the dashed lines 67 and 68. From each further position III and IV, the subpixel strips or image strips visible from there each start, seen from the left, at a subpixel identified by a dotted line 69 or a dot-dashed line 70. The arrow points of the lines 65 to 70 each show at which subpixel the respective subpixel strip begins. As also shown in FIG. 10, the subpixel strips may have different widths and end at the next respective arrow point. Alternatively, the subpixel strips may also have the same width throughout, as shown in FIG. 7.

The reproduction system according to FIG. 10 has the peculiarity, as contrasted with FIG. 1, that not just two half images or perspectives are allocated to the subpixels of the image screen 1 for a right and left eye but, continuously, image strips that come from more than two perspectives. In particular, the four subpixel strips beginning at the arrow tips 65, 67, 69 and 70 come from one and the same image section which, however, was recorded from different viewing directions. Therefore, subpixel strips 71 to 74 are allocated to one image strip in FIG. 10 one after the other, which are allocated to the perspectives from the positions I to IV such that from each of the four positions, it is always only the associated subpixel strip or image strip or a particular perspective that is visible. Following this (i.e. in FIG. 10, continuing towards the right), this sequence of viewing directions repeats for further image screen sections, whereby the associated subpixel strips are again controlled with signals from right to left that correspond to the associated views from the four viewing directions I to IV, whereby the sequence of viewing directions I to IV is the same everywhere.

In order that for an arbitrary viewing direction, it is not overwhelmingly subpixels of one colour that will be seen, as would be the case, for instance, with the use and arrangement of the lenticular raster screen 33 according to FIG. 4, in similar manner to FIG. 9, suitably a plurality of overlapping subpixel lines are grouped together and controlled in inclined orientation. By this means, it is achieved that from each viewing direction, all three colours R, G and B are always seen, even if with each cylindrical lens only a single subpixel is visible per viewing direction and per line.

Finally, it may be provided that between the different subpixel strips, additional safety pixel strips are provided which, for instance, have the width of one subpixel. This leads, for instance, in FIG. 10 thereto that of each subpixel strip, only a central section 75 is visible, whilst in each case, one subpixel strip lying to the right or the left of it serves as an invisible safety strip 76 or 77. By this means, the problem of overlapping of adjacent pixel strips that can arise due to the inclined course of the subpixels and due to the simultaneous use of one subpixel (e.g. 78 in FIG. 10) from two adjacent subpixel strips is solved.

Overall, therefore, a substantial difference in the embodiment according to FIG. 10 from the embodiments according to FIGS. 2 to 9 consists solely therein that the separations between the image strips (=visual jumps 30, 31 in FIG. 3) belonging to one view or one perspective are used for the arrangement of a plurality of views. This plurality of views is always simultaneously available. If, therefore, the angular separations between the different views is sufficiently large, the same image may be viewed by a plurality of persons simultaneously in 3-D quality and from the designated perspectives.

The 3-D reproduction system described may be used, for instance, for reproducing images recorded with video cameras, in medical technology for computer tomography or for stereo endoscopy, in architecture for animations of buildings and landscapes and in computer graphics for virtual reality productions or in 3-D games. A further important area of use is "telepresence". In dangerous areas or inaccessible places, remotely-controlled cameras and robots may now be put in place without the natural impression of depth having to be sacrificed.

The invention is not restricted to the embodiments described, which can be developed in manifold fashion. This applies in particular for the types of interlacing described by reference to the drawings, which were described merely in exemplary manner and may be amended, in particular with regard to the number of subpixels per subpixel strip or the number of lenses or barriers distributed over the image screen width per raster screen. It is clear that there may also be cases whereby the image points are formed not from three, but two, or more than three different coloured subpixels. The allocation of subpixels used for brightness and colour control and their distribution to adjoining subpixels or the surroundings and described in the context of high-resolution filtering (S6) may also be amended and adapted to particular needs. Furthermore, it is possible to use the same image screen entirely or partially for other purposes than those described. It would be possible, for instance, to design the barrier raster screens 41 or 42 such that the black barrier strips 45 or 46 may be switched on or off. By this means, the same image screen could also be used by, on the one hand, switching off all barrier strips 45, 46, for normal two-dimensional representations. On the other hand, it is conceivable to use, for instance, one half of the image screen in the manner described, whilst the other half is used for two-dimensional representations by switching off the barrier strips 45, 46. Finally, it should be understood that the various features and process steps (e.g. (S1) to (S6)) can also be used in other combinations than those shown and described.

The invention claimed is:

1. Autostereoscopic reproduction system for 3-D representation, comprising a processor unit (3) for obtaining first and second image strip signals (10, 11) for different viewing directions, an image screen (1) with image pixels arranged in lines and adjoining one another, which each have a predetermined number of subpixels (R, G, B) of different colours arranged side by side, a coding unit (6, 9) for interlaced control of the subpixels (R, G, B) with the image strip signals (10, 11) such that in each line of the image screen (1), in alternating manner, sequential first and second subpixel strips (25, 26; 35, 36; 49, 50; 61, 62) generates respectively a first and a second image strip (28, 29; 37, 38; 47, 48; 55, 56) for the viewing directions, and a raster screen (20, 33, 41, 42) arranged in front of the image screen (1), which for a defined viewing region in front of the image screen (1) combines the first and second image strips (28, 29; 37, 38; 47, 48; 55, 56) to first and second images, wherein the coding unit (6, 9) is controllable and the raster screen (20, 33, 41, 42) is dimensioned and arranged such that at least the first and second image strips (28, 29; 37, 38; 47, 48; 55, 56, 71, 72) and possibly further image strips generated in a selected region of the image screen (1) appear to one or more observers to be overlap-free (disjoint) and a constant sequence of the colours of the subpixels (R, G, B) is obtained in the first (second) subpixel strip (25, 26; 35, 36; 49, 50; 61, 62), wherein the raster screen (20) is a lenticular raster screen with cylindrical lenses (22a, 22b) arranged at an angle to the vertical (v) of the image screen (1) and that the subpixels (R, G, B) on the image screen are controllable such that the visible first and second subpixel strips (61, 62) have substantially the same inclination as the cylindrical lenses (22a, 22b).

2. Reproduction system according to claim 1, wherein the first (second) subpixel strips (25, 26; 35; 36; 49, 50; 61, 62) are separated from each other such that the separations (30, 31) between lateral ends of a first (second) subpixel strip (25, 26; 35; 36; 49, 50; 61, 62) facing towards each other from a first (second) subpixel strip (25, 26; 35, 36; 49, 50; 61, 62) leading it and/or following it in the line direction corresponds to a whole number multiple of an image pixel or the width of a subpixel.

3. Reproduction system according to claim 1, wherein further subpixels (27) are arranged between the first and second subpixel strips (25, 26) assigned to the image strips (28, 29).

4. Reproduction system according to claim 1, wherein the raster screen (20) is mounted undisplaceable relative to the image screen (1).

5. Reproduction system according to claim 1, wherein the further subpixels (27) serve for spatial separation of the first and second subpixel strips (25, 26) and the raster screen (20) is designed and arranged such that the further subpixels (27) are invisible.

6. Reproduction system according to claim 1, wherein the coding unit (6, 9) is set up to control the further subpixels (27).

7. Reproduction system according to claim 1, wherein the raster screen (33) has a pitch separation which substantially corresponds to the width of two subpixels (R, G, B) and that the arrangement is undertaken such that the subpixels (R, G, B) in each line are assigned in alternating manner to the first and second image and each subpixel strip (35, 36) has the width of one subpixel (R, G, B).

8. Reproduction system according to claim 1, wherein the processor unit (3) and/or the coding unit (6, 9) is assigned to a position detector (14) indicating the position of an observer in front of the image screen (1).

9. Reproduction system according to claim 1, wherein a fine horizontal adjustment of the lenticular raster screen (20) relative to the image screen (1) takes place by means of a corresponding inclination of the visible subpixel strips (61, 62).

10. Reproduction system according to claim 1, wherein the first and second images (4, 5) are compressed in the horizontal direction before formation of the image strip signals (7, 8).

11. Autostereoscopic reproduction system for 3-D representation, comprising a processor unit (3) for obtaining first and second image strip signals (10, 11) for different viewing directions, an image screen (1) with image pixels arranged in lines and adjoining one another, which each have a predetermined number of subpixels (R, G, B) of different colours arranged side by side. a coding unit (6, 9) for interlaced control of the subpixels (R, G, B) with the image strip signals (10, 11) such that in each line of the image screen (1), in alternating manner, sequential first and second subpixel strips (25, 26; 35, 36; 49, 50; 61, 62) generates respectively a first and a second image strip (28, 29; 37, 38; 47 48; 55, 56) for the viewing directions, and a raster screen (20, 33, 41, 42) arranged in front of the image screen (1), which for a defined viewing region in front of the image screen (1) combines the first and second image strips (28, 29; 37, 38; 47, 48; 55, 56) to first and second images, wherein the coding unit (6, 9) is controllable and the raster screen (20, 33, 41, 42) is dimensioned and arranged such that at least the first and second image strips (28, 29; 37, 38; 47, 48; 55, 56, 71, 72) and possibly further image strips generated in a selected region of the image screen (1) appear to one or more observers to be overlap-free (disjoint) and a constant sequence of the colours of the subpixels (R, G, B) is obtained in the first (second) subpixel strip (25, 26; 35, 36; 49, 50; 61, 62), wherein the first and second images (4, 5) are compressed in the horizontal direction before formation of the image strip signals (7, 8), wherein the subpixel values of the first and second ith pixels of the compressed images (7, 8) are copied in colour-true manner onto the subpixels of the ith first and second strips of the image screen (1) in correspondence to (49) and (50), whereby the starting positions of the individual strips are calculated adaptively, for instance, using the Equations (20) and (21), whereby a colour appearing twice in one image screen strip is also recorded twice.

12. Reproduction system according claim 11, wherein three dynamic words startr, startl and scpitch are defined and on the display the kth first strip begins with the subpixel which corresponds to the whole number portion of the product (startr+k)*scpitch, named int{(startr+k)*scpitch}, and the second with the subpixel that corresponds to the whole number portion of the product (startl+k)*scpitch.

13. Reproduction system according to claim 11 wherein a constant horizontal compression factor stretch0 (e.g. stretch0=0.33) is predetermined and the value scpitch is split into a whole-number constant portion sp0 and a dynamic portion scpitchv, where scpitch=sp0+scpitchv, that the subsequent subpixels of the first compressed image, sfr0+int{k*scpitchv} to sfr0+int{k*scpitchv}+spon0 are copied into the first kth image screen strip in the same ascending sequence, whereby sfr0 is chosen such that the colour of the first subpixel in the kth first strip corresponds to the colour of the first subpixel from the first compressed image sfr0+int(k*strechv) and the size of spon0 is chosen such that the entire kth first strip is covered on the image screen, and that a similar procedure is used for the second strip.

14. Reproduction system according to claim 11, wherein only the first three subpixels of a kth strip are copied in and the remainder of the kth first or second strip are set to black, i.e. to 0.

15. Reproduction system according to claim 11, wherein the subpixels spr0+int{startr+k*scpitch} to spr0+int{startl+k*scpitch}−1 of the first uncompressed image are copied into the kth strip in colour-true manner and into the kth second strip, the subpixels spl0+int{startl+k*scpitch} to spl0+int{startr+(k+1)*scpitch}−1, whereby spr0 and spl0 are chosen once for the whole image such that colour-true copying is assured.

16. Reproduction system according to claim 11, wherein a fourth word stretch is passed dynamically and the first and second images generated in original size are compressed by the factor stretch, then subsequently to be stretched in filtering manner by a constant factor 1/stretch0 or the dynamic factor 1/stretch, and then to be copied dynamically and interlaced to the first and second strips of the image screen.

17. Reproduction system according to claim 11, wherein to each subpixel is assigned its own brightness (grey level) information (Y) in positionally faithful manner, whilst the associated colour information is distributed in weighted manner to the corresponding colour subpixels in the surroundings of the same subpixel strip and possibly also to at least one adjoining subpixel strip of the same perspective.

18. Autostereoscopic reproduction system for 3-D representation, comprising a processor unit (3) for obtaining first and second image strip signals (10, 11) for different viewing directions, an image screen (1) with image pixels arranged in lines and adjoining one another, which each have a predetermined number of subpixels (R, G, B) of different colours arranged side by side, a coding unit (6, 9) for interlaced control of the subpixels (R, G, B) with the image strip signals (10, 11) such that in each line of the image screen (1), in alternating manner, sequential first and second subpixel strips (25, 26; 35, 36; 49, 50; 61, 62) generates respectively a first and a second image strip (28, 29; 37, 38; 47, 48; 55, 56) for the viewing directions, and a raster screen (20, 33, 41, 42) arranged in front of the image screen (1), which for a defined viewing region in front of the image screen (1) combines the first and second image strips (28, 29; 37, 38; 47, 48; 55, 56) to first and second images, wherein the coding unit (6, 9) is controllable and the raster screen (20, 33, 41, 42) is dimensioned and arranged such that at least the first and second image strips (28, 29; 37, 38; 47, 48; 55, 56, 71, 72) and possibly further image strips generated in a selected region of the image screen (1) appear to one or more observers to be overlap-free (disjoint) and a constant sequence of the colours of the subpixels (R, G, B) is obtained in the first (second) subpixel strip (25, 26; 35, 36; 49, 50; 61, 62), wherein first and second original images (4, 5) are generated or made available in full pixel resolution and from these images, HR-compressed images generated according to the system setting (S6), in which the brightness values Y=(R+G+B)/3 of the original images are filtered onto the subpixels by means of an HR filter HYF(i,k) according to Equation (26), whereby the sum of all the filter coefficients is equal to 1 (Equation (22)), whilst the parts of the coefficients operating on the same colours have the sum ⅓ (Equations (23, 24, 25)).

19. Reproduction system according to claim 18, wherein first and second original images (4, 5) are generated or made available in full pixel resolution and from these, images compressed to ⅓ horizontally by means of a suitable deep-pass CTP(i), (e.g. Equations (1, 2)) are created according to Equation (3), and that these are interlaced according to (S5) such that the subpixels belonging to the respective partial images are copied in unaltered sequence into the first and second strips, whereby the start pixels are found according to Equations (20) or (21) using the given number SPJ.

20. Reproduction system according to claim 18, wherein first and second original images (4, 5) are generated or made available in full pixel resolution and from these images, images horizontally compressed to ⅓ by means of a suitable deep-pass CTP(i) (e.g. Equations (1, 2)) are created according to Equation (3), and that from these compressed images, the colour difference values DR=R−Y, DG=G−Y and DB=B−Y are formed, these are overlaid deep-pass filtered (e.g. according to Equations (28, 27)) on the HR-compressed images formed according to claim 18 and interlaced as in claim 18 according to (S5).

21. Reproduction system according to claim 18, wherein first and second images are generated or made available in original size and conventional resolution, although they do not exhaust the full brightness value range from 0 to 255, but a restricted value range, for instance, between 30 and 240, which may also be achieved through contrast reduction, and that a grey base value is added to the compressed and HR-filtered image (e.g. the value 30), such that on filtration according to claim 18, negative brightness values from negative filter coefficients can also be taken into account, provided they do not exceed the base value in the negative direction.

22. Reproduction system according to claim 18, wherein subpixels of adjoining lines are also included in the HR-compression filtering according to claim 19 and the colour overlaying according to claim 20 as, for instance, Tables 2 and 3 show.

23. Reproduction system according to claim 18, wherein black and white patterns or character fonts according to one of the above methods is made available in a compressed HR-format, stored and made available for insertion.

24. Reproduction system according to claim 18, wherein, from the dynamic parameters startr, startl and scpitch, the observer positions are reconstructed and the object scenes are automatically generated from the correspondingly adjusted camera positions.

25. Reproduction system according to claim 18, wherein the dynamic position-adaptation may also be paused, stopped or switched off and that the parameter scpitch may, among other things, be exactly twice as large as one colour subpixel.

26. Autostereoscopic reproduction system for 3-D representation, comprising a processor unit (3) for obtaining first and second image strip signals (10, 11) for different viewing directions, an image screen (1) with image pixels arranged in lines and adjoining one another, which each have a predetermined number of subpixels (R, G, B) of different colours arranged side by side, a coding unit (6, 9) for interlaced control of the subpixels (R, G, B) with the image strip signals (10, 11) such that in each line of the image screen (1), in alternating manner, sequential first and second subpixel strips (25, 26; 35, 36; 49, 50; 61, 62) generates respectively a first and a second image strip (28, 29; 37, 38; 47, 48; 55, 56) for the viewing directions, and a raster screen (20, 33, 41, 42) arranged in front of the image screen (1), which for a defined viewing region in front of the image screen (1) combines the first and second image strips (28, 29; 37, 38; 47, 48; 55, 56) to first and second images, wherein the coding unit (6, 9) is controllable and the raster screen (20, 33, 41, 42) is dimensioned and arranged such that at least the first and second image strips (28, 29; 37, 38; 47, 48; 55, 56, 71, 72) and possibly further image strips generated in a selected region of the image screen (1) appear to one or more observers to be overlap-free (disjoint) and a constant sequence of the colours of the subpixels (R, G, B) is obtained in the first (second) subpixel strip (25, 26; 35, 36; 49, 50; 61, 62), wherein first and second colour images are generated or made available in original size and resolution in R, G, B and h, w, c format (Equations (29, 30)), the w-portion (white) according to claims 15, 16 or 17 is HR-filtered and the two colour values f1=c.cos(O) and f2=c.sin(O) occurring in the h-component are respectively added to the associated colour subpixels in the surroundings of the subpixel Sop, on which the subpixel filter operates, are filtered over a coefficient sum of 1, whereby the coefficient weights behave approximately reciprocally to the distance from the central subpixel Sop, whereby when the colour of the central subpixel Sop occurs, a filter with the coefficient sum SKo=0 is used, whose coefficient to the central subpixel Sop has the value 1, and the filter is controlled with the colour value c from the (h, w, c)-format.

27. Reproduction system according to claim 26, wherein, given suitable HR-filtering, the resulting colour subpixel values are restricted to the permissible range and to whole numbers as the colour value.

28. Reproduction system according to claim 26, wherein the first and second image strip signals, image strips and subpixel strips are assigned to the right or left eye (23, 24) of an observer.

29. Reproduction system according to claim 26, wherein between the first and second subpixel strips, further subpixel strips assigned to different viewing directions are present (FIG. 10), of which from each viewing direction only two are visible for the right and left eye of an observer.

30. Reproduction system according to claim 26, wherein image signals belonging to the further subpixel strips are permanently copied into the subpixel strips.

31. Reproduction system according to claim 26, wherein the arrangement is made such that for at least two observers, first and second image strips with the associated perspectives, or at least four image strips with the associated different perspectives are simultaneously visible.

* * * * *